United States Patent
Asano et al.

(10) Patent No.: US 8,296,543 B2
(45) Date of Patent: Oct. 23, 2012

(54) COMPUTER SYSTEM MANAGEMENT APPARATUS AND MANAGEMENT METHOD FOR THE COMPUTER SYSTEM

(75) Inventors: Masayasu Asano, Yokohama (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 12/616,635

(22) Filed: Nov. 11, 2009

(65) Prior Publication Data
US 2011/0078405 A1    Mar. 31, 2011

(30) Foreign Application Priority Data
Sep. 25, 2009    (JP) ................. 2009-220107

(51) Int. Cl.
*G06F 12/00* (2006.01)
(52) U.S. Cl. ............. 711/170; 711/162; 711/114
(58) Field of Classification Search ........... 711/170, 711/162
See application file for complete search history.

(56) References Cited

U.S. PATENT DOCUMENTS

| 2005/0091455 A1 | 4/2005 | Kano et al. |
| 2006/0020664 A1* | 1/2006 | Umeda .................... 709/203 |
| 2007/0016726 A1* | 1/2007 | Zohar et al. ............... 711/114 |
| 2010/0082923 A1* | 4/2010 | Wakabayashi et al. ....... 711/162 |

FOREIGN PATENT DOCUMENTS
JP    2003-015915    1/2003
* cited by examiner

*Primary Examiner* — Hashem Farrokh
(74) *Attorney, Agent, or Firm* — Foley & Lardner LLP

(57) ABSTRACT

Provided is a computer system including a plurality of storage apparatuses, in which, if the storage apparatuses employ an external mapping/connection system, the plurality of storage apparatuses can efficiently use each other's storage resources. The computer system includes a plurality of storage apparatuses and a management computer for managing the storage apparatuses. The management computer determines whether or not it is possible to perform external connection between the plurality of storage apparatuses and whether or not it is possible to divert the use of a storage device in one storage apparatus to another storage apparatus, on the basis of a criteria table, and if it is possible to perform external connection between the plurality of storage apparatuses, it is carried out and, if it is not possible, the management computer diverts the use of a storage device in one storage apparatus to another storage apparatus.

8 Claims, 26 Drawing Sheets

| POOL ID | POOL VOLUME ID | CHUNK ID | ALLOCATED LBA | ALLOCATION STATUS |
|---|---|---|---|---|
| P1 | V100 | C11 | 0G—2G | ALLOCATED (V1) |
| P1 | V100 | C12 | 2G—4G | ALLOCATED (V1) |
| P1 | V101 | C13 | 0G—2G | ALLOCATED (V2) |
| P1 | V101 | C14 | 2G—4G | ALLOCATED (V1) |
| P1 | V101 | C15 | 4G—6G | NOT-ALLOCATED |

FIG.5

| VIRTUAL VOLUME ID /5000 | POOL ID /5010 | CHUNK ID /5020 | ALLOCATED LBA /5030 /5040 |
|---|---|---|---|
| V1 | P1 | C11 | 0G-2G |
| V1 | P1 | C12 | 2G-4G |
| V1 | P1 | C14 | 4G-6G |
| V2 | P1 | C13 | 2G-4G |

FIG.7

| STORAGE ID 7000 | RAID GROUP ID 7010 | ENTIRE CAPACITY 7020 | USED SPACE SIZE 7030 | UNUSED SPACE SIZE 7040 / 7050 |
|---|---|---|---|---|
| S1 | RG1 | 300G | 100G | 200G |
| S2 | RG2 | 300G | 300G | 0G |
| S3 | RG3 | 4T | 150G | 3.85TB |
| S1 | E-1(S2) | 100G | 50G | 50G |

FIG. 8

| STORAGE ID 8000 | RAID GROUP ID 8010 | DISK TYPE 8020 | RAID TYPE 8030 | NUMBER OF DISKS 8040 |
|---|---|---|---|---|
| S1 | RG1 | FLASH | RAID5 | 4 |
| S2 | RG2 | FC | RAID5 | 4 |
| S3 | RG3 | SATA | RAID6 | 6 |

FIG.9

| STORAGE ID 9000 | POOL ID 9010 | ENTIRE CAPACITY 9020 | ALLOCATED SPACE SIZE 9030 | THRESHOLD VALUE 9040/9050 |
|---|---|---|---|---|
| S1 | P1 | 100G | 10G | 80% |
| S2 | P2 | 200G | 120G | 80% |
| S3 | P3 | 100G | 20G | 80% |

FIG.10

| STORAGE ID | VIRTUAL VOLUME ID | VIRTUAL POOL ID | VIRTUAL CAPACITY | ALLOCATED REAL SPACE SIZE | Read-Only |
|---|---|---|---|---|---|
| S1 | V1 | P1 | 1T | 10G | N |
| S2 | V2 | P2 | 1T | 100G | N |
| S3 | V3 | P3 | 100G | 20G | Y |

FIG.11

| STORAGE ID /11000 | POOL VOLUME ID /11010 | RAID GROUP ID /11020 | CAPACITY /11030 | ALLOCATED SPACE SIZE /11040 /11050 |
|---|---|---|---|---|
| S1 | V100 | RG1 | 50G | 10G |
| S1 | V101 | RG2 | 50G | 10G |
| S1 | V102 | RG3 | 50G | 15G |
| S1 | V103 | RG1 | 50G | 20G |
| S1 | V104 | RG3 | 50G | 5G |
| S1 | V105 | RG3 | 50G | 20G |
| S1 | V106 | E-1(S2) | 50G | 30G |

FIG.13

| STORAGE ID | CAPACITY UTILIZATION RATE | POWER | POWER THRESHOLD VALUE |
|---|---|---|---|
| S1 | HIGH | 200W | 250W |
| S2 | LOW | 100W | 120W |
| S3 | LOW | 100W | 300W |

FIG.14

| STORAGE ID | TYPE | MODEL NUMBER | SIZE | NUMBER OF MOUNTED DISKS | NUMBER OF MOUNTABLE DISKS |
|---|---|---|---|---|---|
| S1 | FC | C11 | 300G | 4 | 4 |
| S2 | SSD | C12 | 100G | 4 | 4 |
| S3 | SATA | C14 | 1T | 6 | 6 |
| S3 | SAS | C13 | 500G | 0 | 4 |

FIG.15

| SPACE RESERVATION OPERATION | DISK COMPATIBILITY | EXTERNAL CONNECTING SETTING | SPACE-PROVIDING STORAGE PERFORMANCE | SPACE-PROVIDING STORAGE POWER |
|---|---|---|---|---|
| ERROR | N | N | N | N |
| DISK MOUNTING | Y | N | N | N |
| EXTERNAL CONNECTION | N | Y | N | N |
| ERROR | N | N | Y | N |
| ERROR | N | N | N | Y |
| DISK MOUNTING | Y | Y | N | N |
| DISK MOUNTING | Y | N | Y | N |
| DISK MOUNTING | Y | N | N | Y |
| EXTERNAL CONNECTION | N | Y | Y | N |
| EXTERNAL CONNECTION | N | Y | N | Y |
| ERROR | N | N | Y | Y |
| EXTERNAL CONNECTION | Y | Y | Y | N |
| DISK MOUNTING | Y | Y | N | Y |
| DISK MOUNTING | Y | N | Y | Y |
| EXTERNAL CONNECTION | N | Y | Y | Y |
| EXTERNAL CONNECTION | Y | Y | Y | Y |

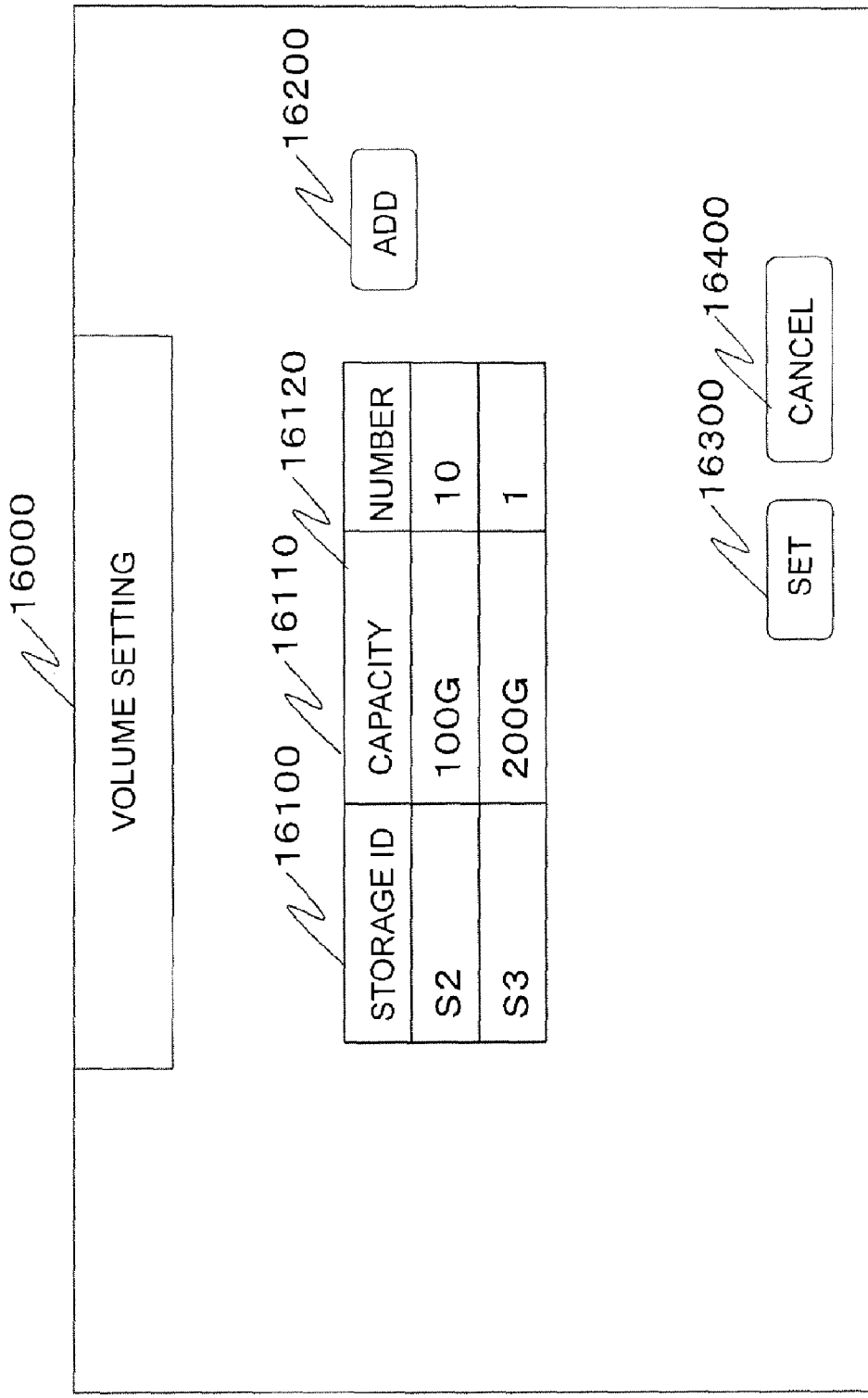

COMPUTER SYSTEM MANAGEMENT APPARATUS AND MANAGEMENT METHOD FOR THE COMPUTER SYSTEM

CROSS-REFERENCES TO RELATED APPLICATIONS

This application relates to and claims priority from Japanese Patent Application No. 2009-220107, filed on Sep. 25, 2009, the entire disclosure of which is incorporated herein by reference.

BACKGROUND

1. Field of the Invention

The present invention relates to a computer system, and in particular, a storage system. More particularly, this invention relates to a computer system that employs an external connection function in a plurality of storage apparatuses. This invention also relates to a management apparatus and a management method for the computer system.

2. Description of Related Art

Storage apparatuses that are computers for providing large-capacity storage resources to host computers are well known. A storage apparatus creates logical storage areas from storage resources and provides them to host computers. The logical storage areas are called logical volumes. A particular kind of logical volume having a virtualized storage capacity is called a virtual volume. Japanese Patent Laid-Open Publication No. 2003-15915 teaches one example of a system using virtual volumes.

The storage control system taught in Japanese Patent Laid-Open Publication No. 2003-15915 has been known for its thin provisioning system. Although having a virtualized storage capacity, each virtual volume has a plurality of address ranges and a host computer designates one of these addresses when issuing a request for write access to a designated virtual volume.

Each time the storage apparatus accepts a write access request, it allocates a physical storage area in a pool volume— one type of logical volume—to the virtual volume and writes write target data in the physical area allocated to the virtual volume.

Thus, the storage apparatus is capable of dynamically expanding the real storage capacity of the virtual volumes and, when some data is no longer necessary, it releases the storage area storing that data from being allocated to the virtual volume and manages the released storage area as an unused physical area.

Accordingly, the thin provisioning system has an advantage of being capable of using the storage resources in the storage apparatus with efficiency when compared to conventional systems that allocate fixed large-capacity storage areas to logical volumes. Incidentally, when it becomes necessary to expand the storage capacity in order to set a new logical volume in the storage apparatus, a new storage device is added to the storage apparatus.

However, the above-described thin provisioning system is intended to enable efficient use of storage resources in individual storage apparatuses, and not intended for enabling, if the storage system includes a plurality of storage apparatuses in addition to host computers, the storage apparatuses to efficiently use each other's storage resources.

Meanwhile, an external mapping/connection system external mapping/connection system for connecting one storage apparatus to another storage apparatus is also known. This system allows a host computer connected to a first storage apparatus to transparently recognize a storage area in a second storage apparatus connected to the first storage apparatus as a logical volume in the first storage apparatus.

However, when it is impossible to connect the second storage apparatus to the first storage apparatus, the first storage apparatus cannot use the storage resources in the second storage apparatus.

In light of the above point, it is an object of this invention to provide a computer system that allows, when the computer system includes a plurality of storage apparatuses employing the external mapping/connection system external mapping/connection system, the storage apparatuses to use each other's storage resources with efficiency.

Another object of this invention is to provide a computer system in which, even if it is impossible to externally connect a second storage apparatus to a first storage apparatus, the first storage apparatus can use a storage resource in the second storage apparatus.

SUMMARY

This invention provides a computer system that includes a plurality of storage apparatuses and a management computer for managing the storage apparatuses. The management computer determines whether or not it is possible to perform external connection between the plurality of storage apparatuses and whether or not it is possible to divert the use of a storage device in one storage apparatus to another storage apparatus, on the basis of a criteria table, and if it is possible to perform external connection between the plurality of storage apparatuses, it is carried out and, if it is not possible, the management computer diverts the use of a storage device in one storage apparatus to another storage apparatus.

This invention provides a computer system that allows, when the computer system includes a plurality of storage apparatuses employing the external mapping/connection system, the storage apparatuses to efficiently use each other's storage resources.

This invention also provides a computer system that allows, even when it is impossible to externally connect a second storage apparatus to a first storage apparatus, the first storage apparatus to use the storage resources in the second storage apparatus.

Other aspects and advantages of the invention will be apparent from the following description and the appended claims.

BRIEF DESCRIPTION OF THE DRAWINGS

FIG. 5 shows a virtual volume allocation table.

FIG. 7 shows a RAID group capacity table.

FIG. 8 shows a RAID group disk table.

FIG. 9 shows a pool capacity table.

FIG. 10 shows a virtual volume table.

FIG. 11 shows a pool volume table.

FIG. 13 shows a storage utilization information table.

FIG. 14 shows a disk information table.

FIG. 15 shows a space reservation operation table.

FIG. 16 shows a volume setting screen according to Embodiment 1 of this invention.

DETAILED DESCRIPTION OF PREFERRED EMBODIMENTS

Embodiments of this invention will be described below with reference to the attached drawings. Note that, in the following description, each flowchart will be explained as being executed by computer program(s) for convenience, however, each is actually executed by a processor that executes the computer program(s).

Figure 1:
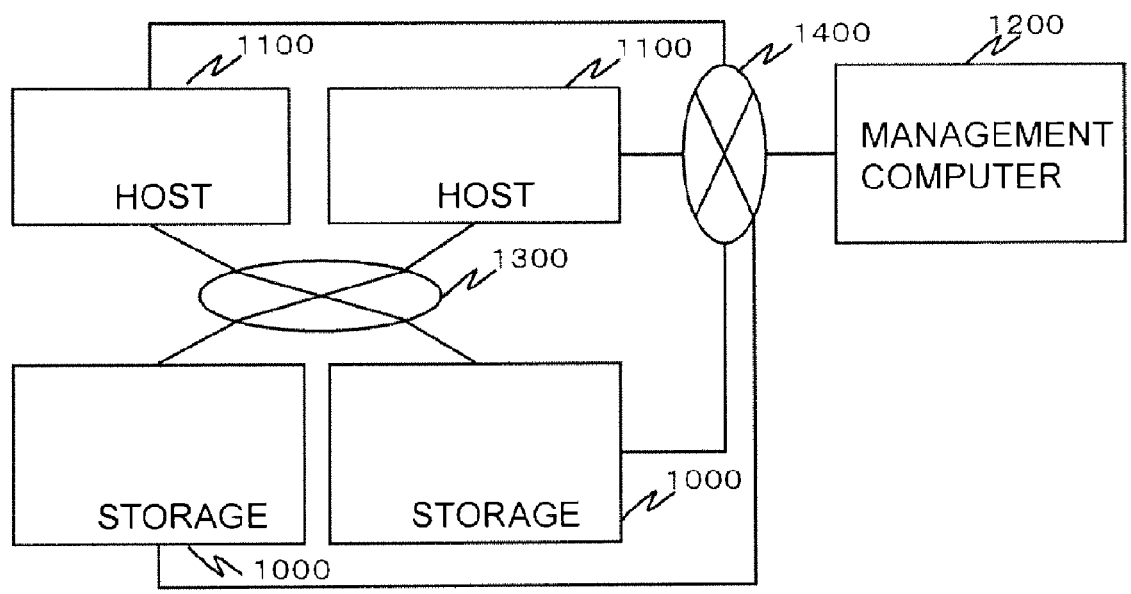
FIG. 1 is a hardware block diagram of a computer system according to Embodiment 1 of this invention.

FIG. 1 shows a configuration of a computer system according to Embodiment 1 of this invention. A plurality of host computers (hereinafter simply referred to "hosts") 1100 and a plurality of storage apparatuses (hereinafter simply referred to as "storages") 1000 are connected to one another via a data network 1300.

Each storage 1000 accepts input/output requests (I/O requests) from the hosts 1100 via the data network 1300. An I/O request is, for example, a write request or a read request designating a logical volume managed in a storage 1000. For each storage 1000, external apparatuses refer to hosts 1100 as well as other storages 1000.

An access from a host 1100 to a storage 1000 is, for example, an access in blocks. Therefore, the data network 1300 is usually a Fibre Channel (FC) network. The data network 1300 may be an iSCSI-compatible TCP/IP network.

As another configuration, a host 1100 may include a storage 1000. In that case, the data network 1300 serves as an internal bus in the host 1100 and the host 1100 also serves as a storage 1000. The host and the storage are realized as Network Attached Storage (NAS).

A management computer 1200 and the respective storages 1000 are connected to one another via a management network 1400. The management computer 1200 obtains information managed in each storage 1000 (e.g., storage configuration information 1042 (see FIG. 2), which will be described later) via the management network 1400. Incidentally, it is possible to employ a configuration where each storage 1000 voluntarily, for example, without accepting a request from the management computer 1200, transmits its own management information to the management computer 1200

The management network 1400 is not limited to a particular type of network. It is possible to employ a configuration where the respective hosts 1100 may be connected to the management network 1400 so that they communicate with the management computer 1200.

It is also possible to use different networks for a first management network connecting the management computer 1200 and the hosts 1100 and a second management network connecting the management computer 1200 and the storages 1000. For example, the first management network being a TCP/IP network and the second management network being an FC network.

Figure 2:
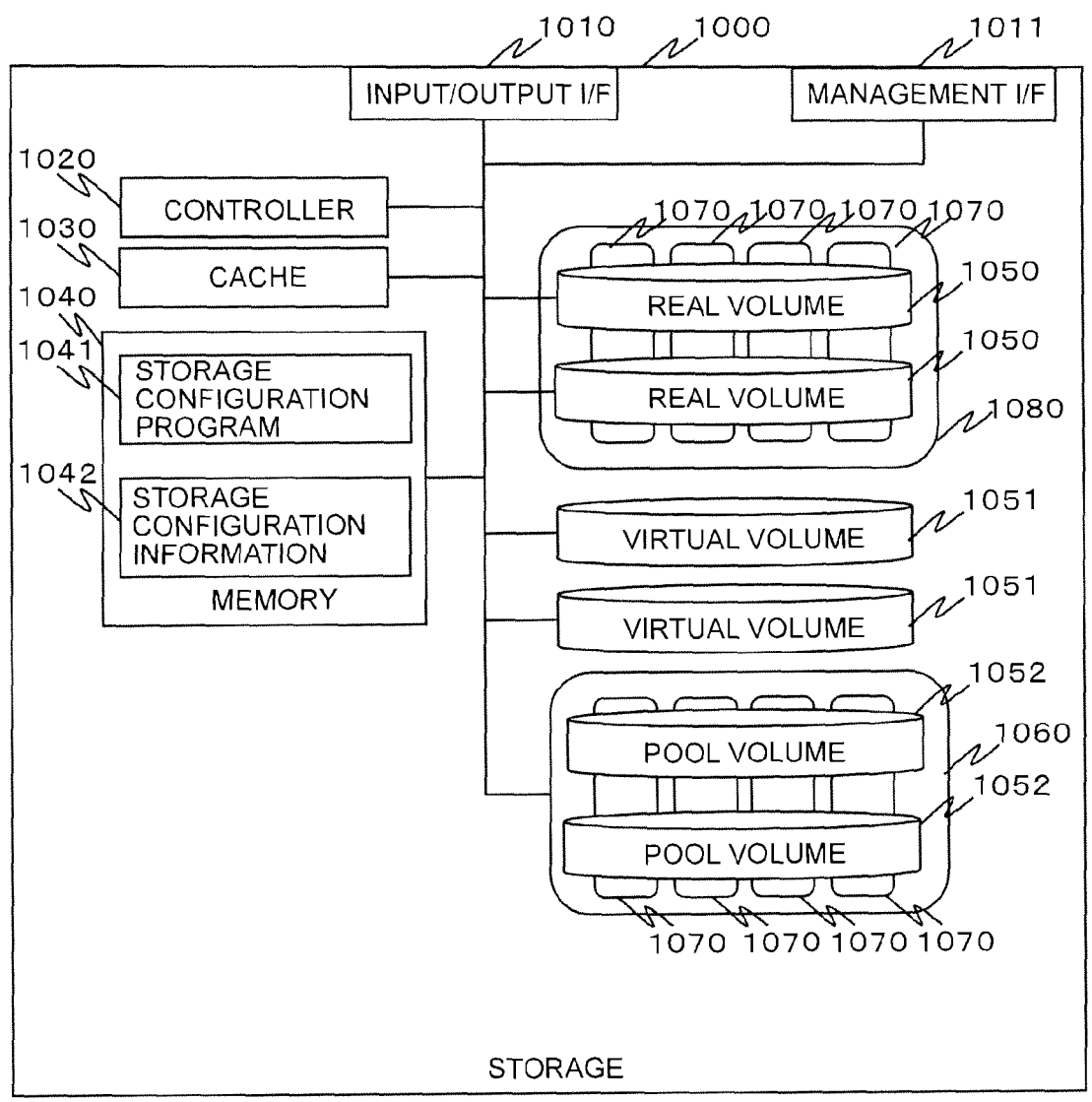
FIG. 2 is a hardware block diagram of a storage apparatus.

FIG. 2 shows a configuration of a storage 1000. A storage 1000 includes: an interface unit (input/output I/F) 1010 connected to the data network 1300 and accepting I/O requests from hosts 1100; an interface unit (management I/F) 1011 connected to the management network 1400 and accepting various requests from the management computer 1200; a controller (e.g., a microprocessor or a circuit board provided with a microprocessor) 1020 for controlling the operation of the storage 1000; cache memory (hereinafter simply referred to as "cache") 1030 connected to the controller 1020 and temporarily storing, for example, data read from or written to logical volumes in order to improve the performance of the storage 1000; memory 1040 connected to the controller 1020; and a plurality of hard disk drives 1070. The respective elements listed above are connected to one another via an internal network.

In place of hard disk drives (hereinafter sometimes simply referred to as "disks" or "hard disks"), other types of storage media, for example, flash memory, may be used.

A RAID group 1080 is configured with a plurality of hard disk drives. The RAID group 1080 stores data at a predetermined RAID level and is configured with two or more hard disks 1070. Logical volumes configured with storage areas in the RAID group 1080, in other words, logical volumes having non-virtualized storage capacities, are real volumes 1050.

Like the real volumes, pool volumes 1052 also have actual storage areas. However, unlike the real volumes, the storage areas in the pool volumes are not allocated to specified hosts, but allocated to virtual volumes 1051.

It is possible to externally connect, of the plurality of storages, one storage (first storage) to another storage (second storage) and present, to the hosts, a real volume in the second storage as a logical volume in the first storage. It is also possible to allocate a storage area in a pool volume in the second storage to a virtual volume in the first storage. Hereinafter, this configuration is called external connection.

The storage 1000 manages a pool 1060. The pool 1060 includes one or more pool volumes 1052. Each pool volume 1052 is configured with a plurality of units of storage areas. The unit of storage areas is defined or classified as a "page" or "chunk," each having a specified storage size.

The storage 1000 also manages virtual volumes 1051. A virtual volume 1051 is a type of logical volume provided to the hosts 1100 and, because its capacity is virtualized, it is a logical volume not configured with the RAID group 1080. The virtual volume 1051 includes virtual areas having a plurality of address ranges. The units of physical storage areas in a pool volume belonging to a pool are allocated to each address range or a plurality of address ranges.

The memory 1040 stores a storage configuration program 1041 and storage configuration information 1042. The storage configuration program 1041 is executed by the controller 1020. The storage configuration information 1042 is the information the storage configuration program 1041 refers to and is management information related to the configuration of the storage 1000. Incidentally, the information 1042 may be stored in the memory 1230 in the management computer 1200 and managed by the management computer 1200 (see FIG. 3).

The storage configuration program 1041 is a program for managing the configuration of the storage 1000 and includes: a first function or means (hereinafter function and means are collectively referred to as a "function") for creating real volumes 1050, virtual volumes 1051, pool volumes 1052 and pools 1060 (volume creation unit); a second function for allocating physical storage areas in the pools 1060 to the virtual volumes 1051 (allocation unit); a third means for providing the real volumes 1050 and the virtual volumes 1051 to the hosts 1100 via the input/output I/F 1010 (providing unit); and a fourth function for migrating data between the real volumes 1050, between the virtual volumes 1051, or between the real volumes and the virtual volumes (data migration unit).

Incidentally, the real volumes 1050 and the pool volumes 1052 each may be configured, not from the RAID group 1080, but from a logical volume in a single hard disk 1070.

Figure 3:
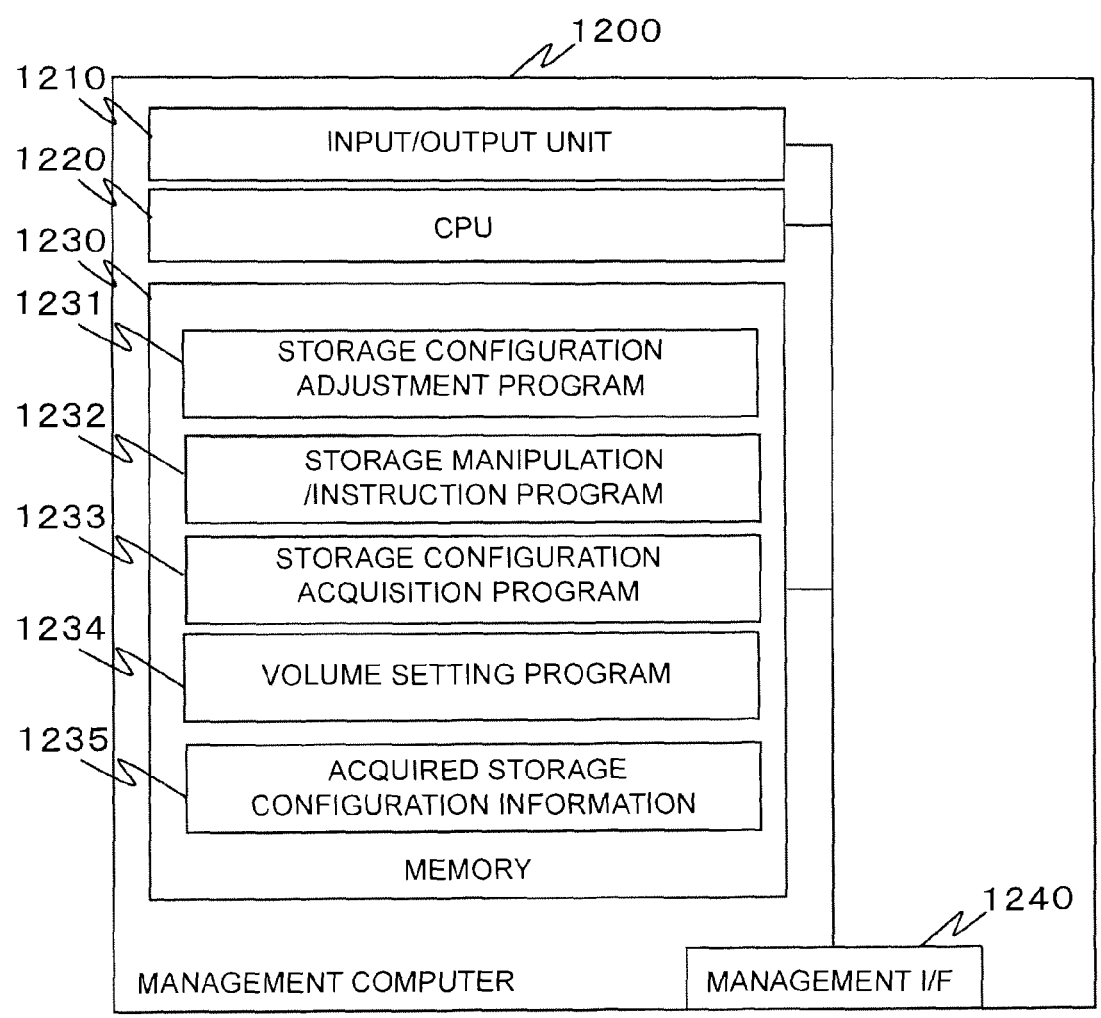
FIG. 3 is a hardware block diagram of a management computer.

FIG. 3 shows a configuration of the management computer 1200. The management computer 1200 includes an input/output unit 1210, a Central Processing Unit (CPU) 1220, memory 1230, and a management I/F 1240.

The management I/F 1240 is an interface unit connected to the management network 1400. The management computer 1200 communicates with the storages 1000 and the hosts 1100 via the management I/F 1240.

The input/output unit 1210 includes: input devices such as, for example, a keyboard, a pointing device, and a microphone; and output devices such as, for example, a display device, a printer, and a speaker.

In order to execute requests from management users or management clients (hereinafter simply referred to as "users"), the memory 1230 stores: a storage configuration adjustment program 1231 for adjusting the storage configurations; a storage manipulation/instruction program 1232 for requesting the storages to make the adjusted configuration settings; a storage configuration acquisition program 1233 for obtaining configuration information from the storages; a volume setting program 1234 for accepting requests for setting logical volumes from users; and acquired storage configuration information 1235 created by the storage configuration acquisition program 1233 having obtained the storage configuration information. The above-described programs 1231 to 1234 are executed by the CPU 1220.

The storage configuration information 1042 in each storage 1000 includes a pool allocation table 4000 (FIG. 4) and a virtual volume allocation table 5000 (FIG. 5). Incidentally, the acquired storage configuration information 1235 created by the storage configuration acquisition program 1233 is derived from the storage configuration information 1042 in the storage 1000.

Figure 4:
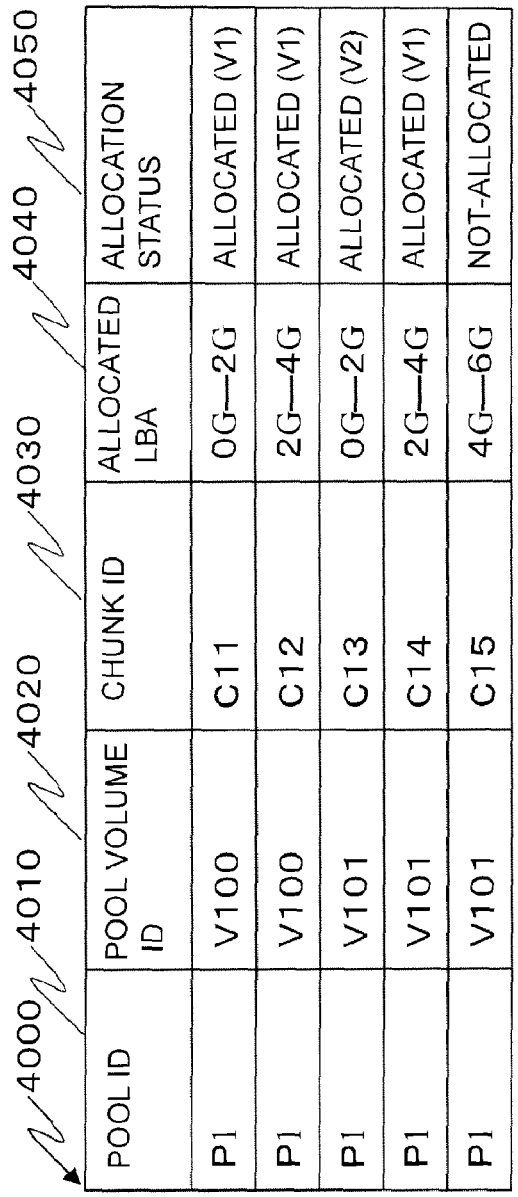
FIG. 4 shows a pool allocation table.

In the tables shown in FIG. 4 and FIG. 5, the unit of storage capacity is "byte" unless otherwise noted. The pool allocation table 4000 (FIG. 4) stores the following information: a pool ID 4010 representing the identifier of a pool 1060; a pool volume ID 4020 representing the identifier of a pool volume 1052 in the pool 1060; a chunk ID 4030 representing the identifier of a chunk, i.e., a physical storage area; an allocated LBA 4040 representing the range of a Logical Block Address (LBA) occupied by the chunk; and an allocation status 4050 representing whether or not the chunk has been allocated to a virtual volume.

Examples of a value of the allocation status 4050 include "allocated," meaning "having been allocated," and "not-allocated," meaning "not having been being allocated". When a value is "allocated," an ID of an allocation destination virtual volume is also included in the value. For example, the table 4000 shows that the chunk having the chunk ID "C11" is a 2 G-byte physical area in the pool volume V100 in the pool P1, having a range starting from the address at 0 GB away from the top of the pool volume V100 and ending at the address at 2 GB away from the top; and that the chunk C11 has been allocated to the virtual volume V1.

Incidentally, the table 4000 shows only some chunks in the pool P1, however, in practice, all chunks in all pools are managed in the same way.

FIG. 5 shows the virtual volume allocation table 5000. The virtual volume allocation table 5000 stores the following information: a virtual volume ID 5010 representing the identifier of a virtual volume 1051; a pool ID 5020 representing the identifier of the pool 1060 associated with the virtual volume 1051; a chunk ID 5030 representing the identifier of an allocated chunk; and an allocated LBA 5040 representing, of the address ranges of the virtual volume 1051, the address range the chunk has been allocated to.

According to the table 5000, for example, the chunk C13 has been allocated to, of the address ranges of the virtual volume V2, an address range starting from the address at 2 G away from the top and ending at the address 4 GB away from the top.

Incidentally, the table 5000 shows information only for some address ranges in the virtual volumes V1 and V2, however, the other address ranges are also managed in the same way.

The storage configuration program constantly updates the pool allocation table 4000 (FIG. 4) and the virtual volume allocation table 5000 (FIG. 5).

An operation performed by a storage 1000 to execute a request for I/O to/from a virtual volume from a host will be described next. The following explanation is about processing performed by the storage 1000 having accepted a write request to a virtual volume 1051.

If no write request has been executed to the virtual volume 1051, no chunk has been allocated to the virtual volume 1051. Incidentally, it is possible to allocate chunks to some address ranges in the virtual volume 1051 from the beginning.

The controller 1020 accepts a write request designating an address range in the virtual volume 1051. The controller 1020 checks whether or not a chunk has been allocated to the designated address range. If a chunk has been allocated, the controller 1020 stores write target data in the allocated chunk.

On the other hand, if no chunk has been allocated to the designated address range, the controller 1020 allocates a chunk that has not been allocated to any address range in the virtual volume 1051 (i.e., non-allocated chunk) to the designated address range, and stores the data in that chunk. The controller 1020 then incorporates the new allocation in the storage configuration information (e.g., the pool allocation table 4000).

Processing executed by the storage 1000 having accepted a read request to a virtual volume 1051 will be described. The controller 1020 accepts a read request designating an address range in the virtual volume 1051.

The controller 1020 then checks whether or not a chunk in a pool 1060 has been allocated to the designated address range. If a chunk has been allocated, the controller 1020 reads data from that chunk and transmits it to the host 1100.

On the other hand, if no chunk has been allocated to the designated address range, the controller 1020 transmits predetermined data corresponding to the amount of data in the designated address range (e.g., all "0") back to the host 1100.

The acquired storage configuration information 1235 in the management computer 1200 will be described. The acquired storage configuration information 1235 includes a storage identification table 6000 shown in FIG. 6, a RAID group capacity table 7000 shown in FIG. 7, a RAID group disk table 8000 shown in FIG. 8, a pool capacity table 9000 shown in FIG. 9, a virtual volume table 10000 shown in FIG. 10, a pool volume table 11000 shown in FIG. 11, an external connection information table 12000 shown in FIG. 12, a storage utilization information table 13000 shown in FIG. 13, a disk information table 14000 shown in FIG. 14, and a space reservation operation table 15000 shown in FIG. 15.

The above-described tables will be described. The storage configuration acquisition program 1233 in the management computer 1200 obtains the storage configuration information 1042 in each storage 1000, creates the tables in FIG. 7 to FIG. 14, and stores them as acquired storage configuration information in the memory 1230. The tables shown in FIG. 6 and FIG. 15 are set in the memory in the management computer by a storage administrator.

Figure 6:
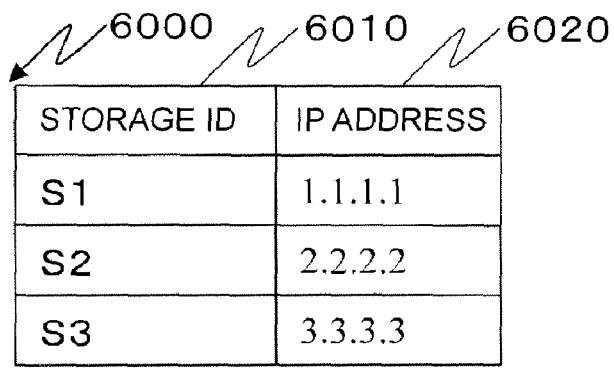
FIG. 6 shows a storage identification table.

FIG. 6 shows the storage identification table 6000. The storage identification table 6000 stores the following information: a storage ID 6010 representing the identifier of a storage 1000; and an IP address 6020 representing information the management computer 1200 refers to when accessing the storage 1000 via the management network 1400. More than one IP address 6020 may be registered for one storage.

FIG. 7 shows the RAID group capacity table 7000. The RAID group capacity table 7000 stores the following information: a storage ID 7010 representing the identifier of a storage 1000; a RAID group ID 7020 representing the identifier of the RAID group existing in the storage 1000; an entire capacity 7030 representing the entire storage capacity of the RAID group; a used space size 7040 representing the size of the used storage area relative to the entire capacity of the RAID group; and a unused space size 7050 representing the size of the unused storage area relative to the entire capacity of the RAID group.

The used space size 7040 is the total size of storage areas allocated to logical volumes (real volumes 1050, pool volumes 1052). The unused space size 7050 is the total size of storage areas not allocated to logical volumes.

In this table, in a case where the entire capacities, used space sizes, and unused space sizes of storage resources are managed in units of storages, not in units of RAID groups, a hyphen "-" may be registered in the fields for the RAID group IDs.

In a state where the second storage is connected to the first storage, i.e., in an external connection state, of the RAID groups in the second storages, the RAID group allocated to the first storage is managed as being distinguished from the RAID groups in the first storage in the table in FIG. 7 (see row 5 in the table in FIG. 7).

In that case, an ID representing an external storage, for example, "E" is registered in the RAID group ID 7020 field. Information for the external storage (second storage) is registered in the respective fields of entire capacity, used space size, and unused space size.

In a case where more than one RAID group in one or more external storages are allocated to the first storage, the RAID groups are distinguished with relevant IDs as in E-1, E-2, . . . . Moreover, in order to provide information for externally-connected storages, storage IDs may be added as in E-1(S2).

FIG. 8 shows the RAID group disk table 8000. The RAID group disk table 8000 stores the following information: a storage ID 8010 representing the identifier of a storage 1000; a RAID group ID 8020 representing the identifier of the RAID group existing in the storage 1000; a disk type 8030 representing the type of hard disk 1070 configuring the RAID group; a RAID type 8040 representing the RAID level of the RAID configuration; and a number of disks 8050 representing the number of hard disks 1070 configuring the RAID group.

FIG. 9 shows the pool capacity table 9000. The pool capacity table 9000 stores the following information for each pool: a storage ID 9010 representing the identifier of a storage 1000; a pool ID 9020 representing the identifier of the pool 1060 existing in the storage 1000; an entire capacity 9030 representing the storage capacity (entire capacity) of the pool 1060; an allocated space size 9040 representing the total size of physical storage areas allocated from the pool 1060 to the virtual volume 1051; and a threshold value 9050 representing a threshold value for the allocated space size.

A threshold value 9050 is a predetermined specific value of the proportion of an allocated space size to an entire capacity and is expressed as, for example, a percentage. The proportion of the allocated space size to the entire capacity, i.e., whether or not the proportion exceeds the threshold value 9050, is a criterion for determining whether or not to expand the entire capacity of the pool. It is possible to execute control so that, when the proportion of the allocated space size to the entire capacity exceeds the threshold value 9050, a physical area will not be allocated from the storage to any virtual volume 1051 unless the pool is expanded.

A threshold value 9050 is either set by a user or set automatically by the storage configuration program 1041 according to the entire capacity of the pool. A threshold value 9050 may be defined by a storage size, instead of by a percentage.

The entire capacity 9030 of a pool is the total capacity of all chunks in the pool and the allocated space size 9040 of the pool is the total size of storage areas of the chunks allocated from the pool 1060 to a virtual volume.

FIG. 10 shows the virtual volume table 10000. The virtual volume table 10000 stores the following information for each virtual volume: a storage ID 10010 representing the identifier of a storage 1000; a virtual volume ID 10020 representing the identifier of the virtual volume 1051 existing in the storage 1000; a virtual pool ID 10030 representing the identifier of the pool 1060 associated with the virtual volume 1051 (i.e., pool as a provider of the physical area allocated to the virtual volume 1051); a virtual capacity 10040 representing the virtualized storage capacity of the virtual volume 1051 recognized by the hosts 1100; an allocated real space size 10050 representing the total size of physical areas allocated to the virtual volume 1051; and a read-only flag 10060 representing whether or not the virtual volume is a read-only virtual volume.

The total size of spaces allocated to the virtual volume 1051 increases with increasing write requests from host to the virtual volume 1051. In order for the hosts 1100 to recognize the virtual volumes 1051, the storages 1000 set information such as logical unit numbers (LUNs) and SCSI port IDs for the respective virtual volumes 1051. In such cases, LUNs and port IDs are also registered in the virtual volume table 10000.

In a read-only flag 10060 field, "Y" is registered if a virtual volume is a read-only virtual volume and "N" is registered if it is not. "Read-only" means that the capacity will not be expanded any more.

FIG. 11 shows the pool volume table 11000. The pool volume table 11000 stores the following information: a storage ID 11010 representing the identifier of a storage 1000; a pool volume ID 11020 representing the identifier of the pool volume existing in the storage 1000; a RAID group ID 11030 representing the identifier of the RAID group 1080 the pool volume 1052 is configured from; a capacity 11040 representing the capacity of the pool volume 1052; and an allocated space size 11050 representing the total size of the storage area of the chunk allocated from the pool volume 1052 to the virtual volume.

The example in FIG. 11 shows that it is also possible to set externally-connected volumes, for example, the pool volume V106 belongs to the RAID group E-1. As explained above in relation to FIG. 7, S2 in E-1(S2) is a storage ID.

Figure 12:
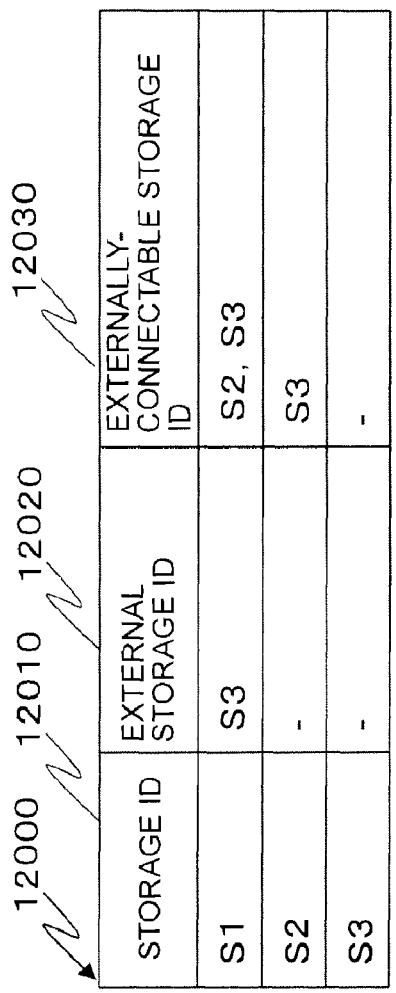
FIG. 12 shows an external connection information table.

FIG. 12 shows the external connection information table 12000. The external connection information table 12000 stores the following information for each storage: a storage ID 12010 representing the identifier of the storage (e.g., first storage) as an external connection destination for another storage (e.g., second storage); an external storage ID 12020 representing the identifier of the storage externally connected to the external connection destination storage (e.g., first storage); and an externally-connectable storage ID 12030 representing the identifier of the storage that can be externally connected to the storage registered in the field for the storage ID 12010.

Information to be registered in a field for the external storage ID 12020 is obtained by detecting, from the storage configuration program in a storage 1000 having the external connection function, the state where an external storage and an external volume are connected (to the storage 1000), for example, information for settings for mapping to external volumes; and then storing the information in the field. Alternatively, the information may be obtained by confirming via the network that external connection mapping has been performed and that an externally-connected storage volume is recognized.

An externally-connectable storage ID 12030 is obtained by detecting a state in which external storage(s) with no external volume(s) is (are) connectable, for example, by discovering port(s) of external storage(s). The information may alternatively be registered manually by a user.

The example in FIG. 12 shows that the storage S2 is externally-connected to the storage S1 and, in addition to the storage S2, the storage S3 can also be externally-connected to the storage S1. At present, the storage S3 is not externally-connected to another storage, however, it is connected to the network so, if a user makes settings for external connection, it can be connected to another storage.

FIG. 13 shows the storage utilization information table 13000. The storage utilization information table 13000 stores the following information: a storage ID 13010 representing the identifier of a storage; a capacity utilization rate 13020 representing the capacity utilization rate of the storage; a power 13030 representing the power consumption of the storage; and a power threshold value 13040 representing a threshold value for the power consumption of the storage.

In this table, capacity utilization rates (13020) of the storages are classified into three levels for convenience: "high," "middle," and "low." A storage having a high capacity utilization rate means that, for example, I/O requests from host computers are concentrated in the storage.

A power 13030 represents the power consumed by a storage. A power threshold value 13040 represents an upper limit of the power available for the storage and, when the power threshold value is exceeded, a shortage of power supplied to the storage may arise. The threshold value 13040 is set by the user of the management computer. The power threshold value 13040 may be set according to the value set for power capping.

FIG. 14 shows the disk type table 14000. The disk type table 14000 stores the following information: a storage ID 14010 representing the identifier of a storage; a type 14020 representing the type of a disk such as FC or SATA; a model number 14030 representing the model number of the disk; a size 14040 representing the size of the disk; a number of mounted disks 14050 representing the number of mounted disks; and a number of mountable disks 14060 representing the number of disks that can be mounted in the future.

When a storage administrator mounts a disk in a storage, the storage administrator selects a disk with the model number matching the model number registered corresponding to the storage. The storage checks the model number of the mounted disk and, if it finds, by referring to the disk type table, that the mounted disk is with a different model number, it reports to that effect to the storage administrator. Models may be different if they are compatible. In this table, it is also possible to register more than one model for one storage.

If there is no room in a storage to mount an additional disk, an extended chassis is installed in the storage. If it is possible to install an extended chassis in the storage, the storage manages the number of mountable disks after the installation of the extended chassis in the table. In a case where a plurality of extended chassis can be installed but only some extended chassis have been installed, the storage administrator may register a possible maximum number of mountable disk drives premised on the maximum number of extended chassis in a field for the number of mountable disks.

FIG. 15 shows the space reservation operation table 15000. The space reservation operation table 15000 is referred to, when expanding the storage capacity of the first storage, to determine whether to externally-connect the second storage to the first storage to achieve the purpose of expanding the storage capacity of the first storage, or to divert the use of the disk drives in the second storage to the first storage. This table is created based on, for example, a policy of attaching priority to employing external connection or a policy of attaching priority to employing diverting the use of disks (i.e., mounting the disks in the second storage in the first storage).

In this table, a space reservation operation 15010 represents the type of space reservation operation. The items 15020, 15030, 15040 and 15050 are criteria for determining a space reservation operation. A space reservation operation mode is registered for each combination of answers to the respective criteria.

A disk compatibility 15020 is represented by a flag indicating whether or not there is disk compatibility, an external connection setting 15030 is represented by a flag indicating whether or not it is possible to externally connect the second storage (space-providing storage) to the first storage apparatus (capacity-expanding storage), space-providing storage performance 15040 is represented by a flag indicating whether or not the performance of the second storage is superior to that of the first storage, and space-providing storage power 15050 is represented by a flag indicating whether or not the power capacity of the second storage is larger than that of the first storage. A "Y" flag indicates a positive answer to a criterion and a "N" flag indicates a negative answer.

For example, where a disk compatibility 15020 is "Y," an external connection setting 15030 is "N," a space-providing storage performance 15040 is "Y," and space-providing storage power 15050 is "N," the space reservation operation corresponding to these flags is "disk mounting," which means that a space should be reserved for the first storage by mounting a disk.

The flags in the table in FIG. 15 are designated by the user. Alternatively, the flags may be determined by the management computer by reading information from the storages. The management computer determines a space reservation operation by referring to the flags set in the table in FIG. 15. The management computer 1200 determines a disk compatibility between storages to be connected to each other by referring to the table shown in FIG. 14. The management computer 1200 determines a possibility of external connections between storages to be connected to each other by referring to the table shown in FIG. 12.

If there is more than one storage as an external connection target, priority is attached to, for example, a criterion related to storage performance. Specifically, if one storage's storage performance 15040 flag is "Y" and its power 15050 flag is "N" while another storage has opposite flags, an administrator selects the former storage as an external connection target storage.

For example, performance superiority and inferiority can be determined according to the I/O per second (IOPS) in terms of random/sequential, read/write accesses.

On the other hand, when two storages both have the same "Y" flags for the same criteria items, the storage having more performance capacity is selected as a storage for external connection. Priority may be attached to power instead of performance. It is also possible to take both performance and power into consideration.

Incidentally, if there is a plurality of storages in need of disk mounting, an order of priority may be determined for the selection of storages, for example, according to the ID numbers of those storages.

Incidentally, the management computer 1200 can change the content of the table in FIG. 15 when a user inputs into the management computer 1200 which criteria item priority should be given to and which of external connection and disk mounting priority should be given to.

In the table in FIG. 15, external connection is given priority as a space reservation operation when a disk compatibility flag and an external connection setting flag are both "Y." This is the result of, for example, the settings made by the user via the management computer.

On the other hand, if there is data, for example, operation speed, that can also be used as a criterion for choosing between disk mounting or external connection, the management computer may collect that data from a space-providing storage and a space-receiving storage or, if there have been relevant inputs from the user, the management computer may analyze them and if it determines that externally-connecting the second storage to the first storage can be carried out faster than mounting a disk from the second storage in the first storage, it may register "external connection" as a space reservation operation in the table in FIG. 15.

Incidentally, if there is a plurality of storages that can be external connection targets, the content of the table in FIG. 15 may be changed for each storage. For example, it is possible to make settings in which priority is attached to external connection for one storage while priority is attached to disk mounting for another storage.

The criteria items shown in FIG. 15 are merely examples and are not intended to exclude other possible criteria items. For example, the management computer may determine which of the storages to use as an external connection target according to the size of unused storage space. As another example, when intending to create a volume 100 G, if the storage S1 has a free space of 200 G and the storage S2 has a free space of 1 T, the space in the second storage S2 may be selected due to its free space size and used to create a volume in the external connection destination storage.

FIG. 16 shows a volume setting screen displayed on the management computer. The volume setting screen 16000 is displayed on a display device (a part of an input/output unit 1210) by the volume setting program 1234. The volume setting screen 16000 is used by users to set volumes.

The volume setting screen 16000 includes: a field 16100 for setting an ID of a storage where a volume is set; a field 16110 for setting the capacity of the volume; and a field 16120 for setting the number of volumes.

The volume setting screen 16000 also includes: a button 16200 for adding another volume to create; a button 16300 for applying volume settings based on the conditions input in the above-described fields; and a button 16400 for cancelling the settings shown on the screen.

Figure 17:
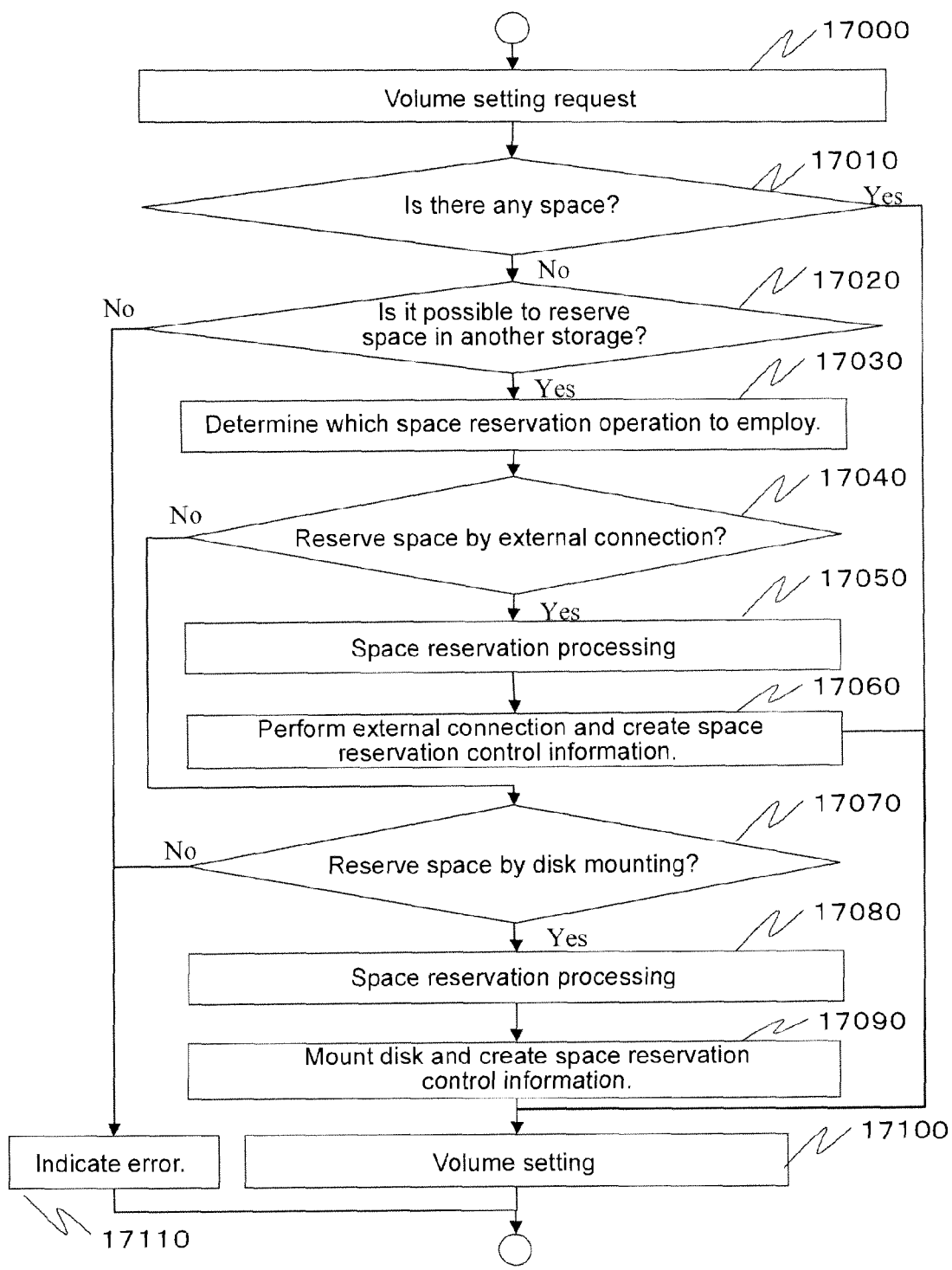
FIG. 17 shows a flowchart of volume creation processing.

FIG. 17 is a flowchart of processing for a volume creation in a storage that belongs to the computer system. The volume setting program 1234 executes steps 17000 and 17010, and the storage manipulation/instruction program 1232 executes steps 17060, 17090, and 17100. The rest of the steps are executed by the storage configuration adjustment program 1231.

Examples of a type of volume to be created include a real volume, a pool volume, and a virtual volume. A virtual volume has two types: a virtual volume to which a pool volume is allocated and an externally-connected virtual volume to which a real volume in an external storage is allocated.

The volume setting program 1234 accepts a volume setting request from a user via the volume setting screen 16000 (see FIG. 16) (S17000). The volume setting program 1234 may also accept a volume setting request, not via the volume setting screen, but in another format such as a command line or a file.

Then, the volume setting program 1234 determines whether or not it is possible to set a volume with a designated capacity in the storage input on the volume setting screen (step 17010).

If the determination in step 17010 is positive, the processing proceeds to step 17100 while if the determination in step 17010 is negative, the processing proceeds to step 17020. The determination (in step 17010) is made based on the information input on the volume setting screen 16000, the RAID group capacity table 7000 (see FIG. 7), and the pool capacity table 9000 (see FIG. 9).

The example in FIG. 16 shows a request to create ten volumes each having a capacity of 100 G in the storage having the storage ID S2, and one volume having a capacity of 200 G in the storage having the storage ID S3.

As shown in the table in FIG. 9, the threshold value for the pool P2 in the storage S2 is exceeded.

The threshold value for the pool P3 in the storage S3 is not exceeded.

The volume setting program 1234 also checks whether or not it is possible to reserve a space in other pools or a space not belonging to any pool, i.e., an unused space registered in the RAID group capacity table 7000. In this example, the unused space size of the storage S2 is 0 G as shown in FIG. 7. Accordingly, the volume setting program 1234 determines that it is impossible to find a space (unused storage area) in the storage S2. On the other hand, the volume setting program 1234 determines that a space can be reserved in the storage S3.

It does not matter which of the RAID group capacity table and the pool capacity table the volume setting program 1234 checks first.

When setting a virtual volume in a storage, the volume setting program may determine whether or not that storage, in the first place, can reserve a space for a possible data write which may be made immediately after the creation of the virtual volume.

For example, it is possible to employ a configuration where a storage must include a free space of 5% of the total size of volume(s) to be created therein, specifically, in the example in FIG. 16, the storage S2 must include a free space of 50 G and the storage S3 must include a free space of 10 G. This determination is made in step S17010. If they cannot reserve spaces of those sizes, the volume setting program 1234 makes a negative determination in step 17010.

Explanations are given with reference to FIG. 9. In the storage S2, the allocated space size in the pool volume P2 is 120 G, which is under the threshold value, however, when 50 G is added to 120 G, its threshold value will be exceeded, therefore a negative determination is made in step 17010. On the other hand, in the storage S3, the allocated space size is 20 G and adding 10 G to 20 G (i.e., 30 G) will not exceed its threshold value, therefore a positive determination is made in step 17010.

When creating volumes in more than one storage, i.e., the storage S2 and the storage S3, when one of the storages has a free space and the other does not, the volume setting program 1234 makes a negative determination in step 17010. On the other hand, when both storages have free space, it makes a positive determination.

Incidentally, when creating a volume having a virtualized capacity (i.e., a virtual volume) in a storage, the user may first make an input on the volume setting screen in FIG. 16 for creating a pool or a pool volume and, after creating the pool or pool volume with unused area(s) in the RAID group or in the pool in that storage or an external storage, set a virtual volume in that storage and then allocate the created pool or pool volume to the virtual volume.

For ease and convenience of explanation, the following explanations, although deviating from the example shown in FIG. 16, explain only about creating a volume in the storage S2 and omit explanations for creating a volume in the storage S3.

In step 17020, the storage configuration adjustment program 1231 determines whether or not it is possible to reserve a free space in, of all the storages managed by the management computer, a storage different from the storage input via the volume setting screen 16000.

If a positive determination is made in step 17020, the processing proceeds to step 17030, while if a negative determination is made in step 17020, the processing proceeds to step 17110. This determination is made based on the information input via the volume setting screen 16000, the RAID group capacity table 7000 (see FIG. 7), and the pool capacity table 9000 (see FIG. 9).

FIG. 16 shows a request for ten virtual volumes each having a capacity of 100 G to be created in the storage S2. The storage configuration adjustment program 1231 searches the pool capacity table in FIG. 9 for the information for the pools in storages other than the storage S2, and detects that the threshold values of the pool P1 in the storage S1 and the pool P3 in the storage S3 are not exceeded.

Accordingly, the storage configuration adjustment program 1231 determines that free spaces can be reserved in storages other than the storage S2 and proceeds to step 17030. Incidentally, if free space cannot be reserved in pool P1 or pool P3, the processing proceeds to step 17110. Also, if free space cannot be found in the pool capacity table 9000, the storage configuration adjustment program 1231 refers to the RAID group capacity table 7000 (FIG. 7) to determine whether or not free space can be reserved. It does not matter which of the RAID capacity table and the pool capacity table the storage configuration adjustment program 1231 refers to first.

It is also possible to determine whether or not free space can be reserved according to increase trends in the allocated space sizes of the pools. Specifically, the allocated space sizes of the pools in FIG. 9 are saved at regular time intervals and if, by referring to the increase trends in the allocated space sizes saved, there are pools having remarkable increase trends, they may be judged as being incapable of reserving free space even if their threshold values for allocation are not exceeded.

Moreover, as shown in FIG. 10, if there is a read-only volume, it is possible to determine, without referring to its trend toward an increase, that the allocated space size of that volume will not increase because there has been no data writing. If a pool includes mostly read-only volumes, it is possible determine that the allocated space size of that pool will not increase any more when all the volumes in that pool are read-only volumes, therefore, the entire free space in the pool can be reserved as a space for another volume.

In step 17030, the storage configuration adjustment program 1231 determines which space reservation operation (FIG. 15) should be performed. The storage configuration adjustment program 1231 makes this determination based on the external connection information table 12000 in FIG. 12, the storage utilization information table 13000 in FIG. 13, the disk type table 14000 in FIG. 14, and the space reservation operation table 15000 in FIG. 15.

First, the storage configuration adjustment program 1231 collects information regarding the respective criteria items such as disk compatibility listed in the table in FIG. 15. Specifically, it collects the disk compatibility 15020 information from the disk type table 14000 in FIG. 14, the external connection setting 15030 information from the external connection information table 12000 in FIG. 12, and the space-providing storage performance 15040 information and space-providing storage power 15050 information from the storage utilization information table 13000 in FIG. 13. Also, it obtains the information for other storages (FIG. 7 and FIG. 9) referred to in the previous step 17020.

With respect to disk compatibility, the disk type table in FIG. 14 shows that the storage S2 has SSDs mounted and the storage S1 and the storage S3 searched for in the previous step 17020 do not have SSDs mounted as their disks. Accordingly, the storage configuration adjustment program 1231 determines that there is no disk compatibility between the storage S1 and the storages S2 and S3.

Regarding the external connection settings, the external connection information table in FIG. 12 shows that the storage S3 can be externally connected to the storage S2. Accordingly, the storage configuration adjustment program 1231 determines that external connection is possible.

If the storage configuration adjustment program 1231 determines both the disk compatibility and the external connection settings to have "N" flags, it makes a negative determination in step 17020 and the processing proceeds to step 17110.

On the other hand, if the storage configuration adjustment program 1231 determines either of the disk compatibility and the external connection settings to have a "Y" flag it reports it to the user and proceeds to step 17030. According to the content of FIG. 14 and FIG. 12, the storage configuration adjustment program 1231 notifies the user that the storage S3 is used to provide a storage space to the storage S2.

The explanation below is about determination as to whether to attach priority to disk mounting or to external connection when it is assumed that both the disk compatibility and the external connection setting are determined to have "Y" flags in step 17030. This determination is made taking into consideration the storage performance (e.g., capacity utilization rates) and the storage power characteristics (FIG. 13).

The storage configuration adjustment program 1231 refers to the storage utilization information table 13000 shown in FIG. 13 to compare performances between the storage S2 and the storage S3. For example, if the performance of the external connection source (storage S3) is low and the performance of the external connection destination (storage S2) is high, the storage configuration adjustment program 1231 determines an answer flag to the criterion item—performance—as "N" while in the contrary case, it is determined as "Y."

In the example in FIG. 13, both the storage S2 and the storage S3 have "low" capacity utilization rates. When the storages have the same values, determination of which of disk mounting and external connection should be selected as a mode for providing storage resource(s) from a storage to be connected to a connection destination storage depends on an answer to the criterion item "power." Specifically, the same answer flag to the criterion item "power" is given to the criterion item "performance."

According to the storage utilization information table 13000 in FIG. 13, the power consumptions of the storage S2 and storage S3 are both 100 W. However, because the threshold value of the storage S2 is low, i.e., 120 W, if an external disk drive is mounted in the storage S2, a power shortage may arise in the storage S2, on the other hand, the threshold value of the storage S3 is high, i.e., 300 W. Therefore, based on these power threshold values, the storage configuration adjustment program 1231 determines an answer flag for the criterion item "power" to be "Y" for the storage S3 (external connection source) because the storage S3 has enough power.

When it is assumed that the answer flags for the criteria items "disk compatibility" and "external connection setting" are both "Y" and also the answer flags for the criteria items "performance" and "power" are both "Y," the storage configuration adjustment program 1231 determines, with reference to the space reservation operation table 15000 in FIG. 15, to select external connection as a space reservation operation. Accordingly, the storage configuration adjustment program 1231 makes a positive determination in step 17040 and proceeds to step 17050.

On the other hand, if a negative determination is made in step 17040, the storage configuration adjustment program 1231 proceeds to step 17070 to select disk mounting, instead of external connection, to reserve a space. Incidentally, if the storage configuration adjustment program 1231 makes an "error" determination in step 17040, it proceeds to step 17070 and then to step 17110.

In step 17050, the storage administrator connects the storage S3 to the storage S2 and the storage configuration adjustment program 1231 executes processing to reserve a storage space in the storage S3 to provide it to the storage S2. An example of the processing executed in step 17050 will be described below.

The storage administrator creates a new virtual volume in the storage S2. The storage administrator then creates, in the storage S3, a pool/pool volume for providing a space to the new virtual volume in the storage S2. Specifically, the storage administrator takes out the created pool volume from the existing pool in the storage S3 and maps the pool volume to the new virtual volume in the storage S2. Here, a new pool may be created in the storage S3 as necessary. Alternatively, the storage administrator may create a pool/pool volume with space in the disk drives or in the RAID group in the storage S3. In order to reserve free space in the storage S3 to allocate it to the storage S2, it is sometimes necessary to migrate data stored in that space to another volume in the pool or RAID group.

Figure 25:
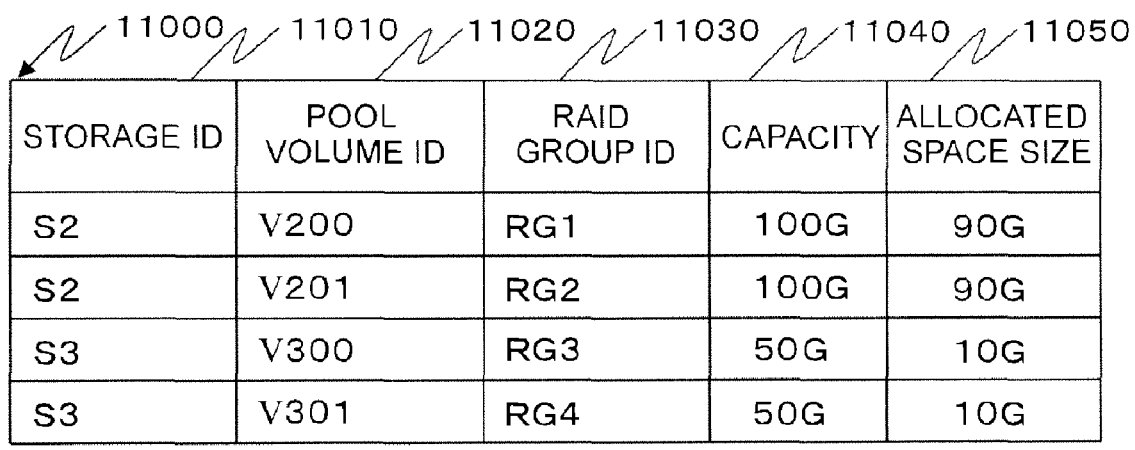
FIG. 25 shows the pool volume table.

A specific example will be explained below with reference to FIG. 25 and FIG. 26. FIG. 25 shows an example where the pool volume table explained above with reference to FIG. 11 is updated with the information for the pool volumes in the storage S2 and the storage S3. The storage S2 has a pool consisting of the pool volumes V200 and V201, the total capacity of the pool is 200 G, and the allocated space size is 180 G. It is assumed that this pool is the pool P2 shown in FIG. 9. The storage S3 has a pool consisting of the pool volumes V300 and V301, the total capacity of the pool is 100 G, and the allocated space size is 20 G. It is assumed that this pool is the pool P3 shown in FIG. 9. Assuming that the virtual volume taken out of the pool in the storage S3 is the virtual volume V3 shown in FIG. 10, this virtual volume V3 is a read-only virtual volume. This means that there will be no increase in the capacity of the virtual volume V3. Therefore, the data in the virtual volume V3 is migrated to another pool so as to reserve free space in the pool P3, a virtual volume is created with that space, taken out, and externally connected to the storage S2, thus providing space to the storage S2.

Figure 26:
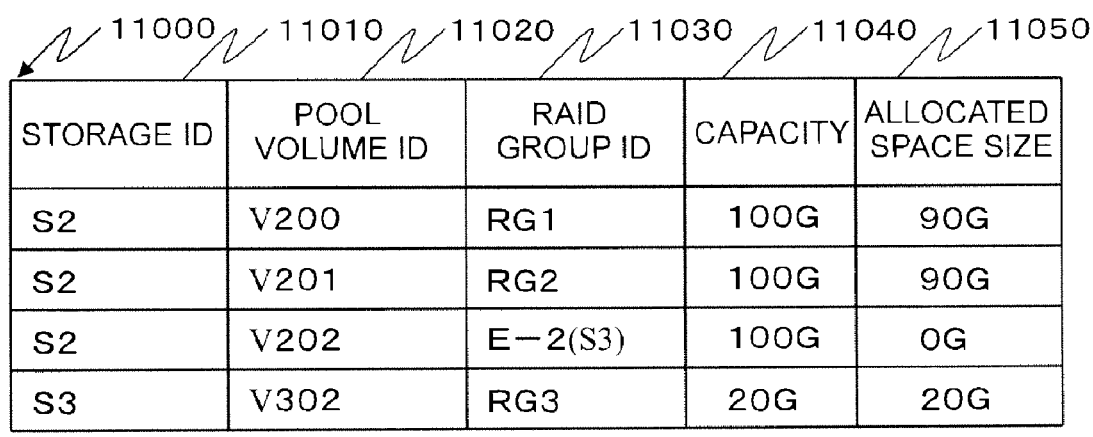
FIG. 26 shows the pool volume table.

FIG. 26 shows the pool volume table updated from the state shown in FIG. 25 to the state in which the volume in the pool P3 has been externally connected, the pool volume V202 has been added, and the capacity of the pool P2 has been increased. It also shows that the data that had been stored in the pool P3 now exists in another pool volume V302 in another pool. Through the above-described processing, a space in another storage is reserved and handled under external connection settings.

In step 17060, the storage manipulation/instruction program 1232 creates control information for the space reservation and transmits it to the relevant storages or to the storage administrators.

In step 17070, the storage configuration adjustment program 1231 determines whether or not a disk drive in the space-providing storage can be mounted in the space-receiving storage. If the storage configuration adjustment program 1231 makes a positive determination, it proceeds to step 17080, while if it makes a negative determination, it proceeds to step 17110.

The storage configuration adjustment program 1231 uses the determination result in step 17030 in the determination in step 17070. Although already explained above in relation to step 17030, for example, if there is disk compatibility but there is no external configuration setting, the storage configuration adjustment program 1231 makes a negative determination in step 17040, proceeds to step 17070, makes a positive determination in step 17070 and the processing proceeds to step 17080. On the other hand, if it is determined that there is no disk compatibility or external connection setting, the storage configuration adjustment program 1231 makes a negative determination in step 17070 and proceeds to step 17110.

In step 17080, when mounting a disk drive in a space-providing storage in a space-receiving storage, the storage configuration adjustment program 1231 determines a space reservation specification such as which disk drive (e.g., an unused disk drive) in the space-providing storage to select. Here, when removing a disk drive from the space-providing storage, it may be necessary to migrate data or volumes from the disk drive to a disk drive that should be maintained in the storage.

The processing then proceeds to step 17090 in which the storage manipulation/instruction program 1232 creates control information for the space reservation and transmits it to the relevant storages and the storage administrators. The storage administrator then removes the disk from the space-providing storage and mounts it in the space-receiving storage (step 17090).

In step 17100, in response to the request explained above in relation to FIG. 16, the storage manipulation/instruction program 1232 or the storage administrator sets, in the space-receiving storage, a real volume and/or a pool volume with the storage space provided by the space-providing storage. Here, it is possible to set, in the space-receiving storage, a RAID group and/or a pool with the storage space provided by the space-providing storage. A result is provided from the management computer 1200 to the management user, management client, or the host computers via the screen shown in FIG. 18, which will be described later.

In step 17110, an error message indicating that it is impossible to expand the capacity of the storage S2 with a space from another storage apparatus belonging to the computer system in FIG. 1, is shown to the management user of the management computer 1200. If it is impossible to set any of the volumes requested in the space-receiving storage, the management computer determines that an error has occurred. It is also possible to create only some of the volumes requested to be created, in the space-providing storage.

Incidentally, it is possible to employ a configuration where the management computer displays, together with the error indication, a prompt message for prompting the storage administrator/management user to add a new disk drive or an expanded chassis as necessary. If expanding the storage capacity of the space-receiving storage is no longer possible, a message prompting reduction of the storage capacity of the space-receiving storage may be displayed.

Figure 18:
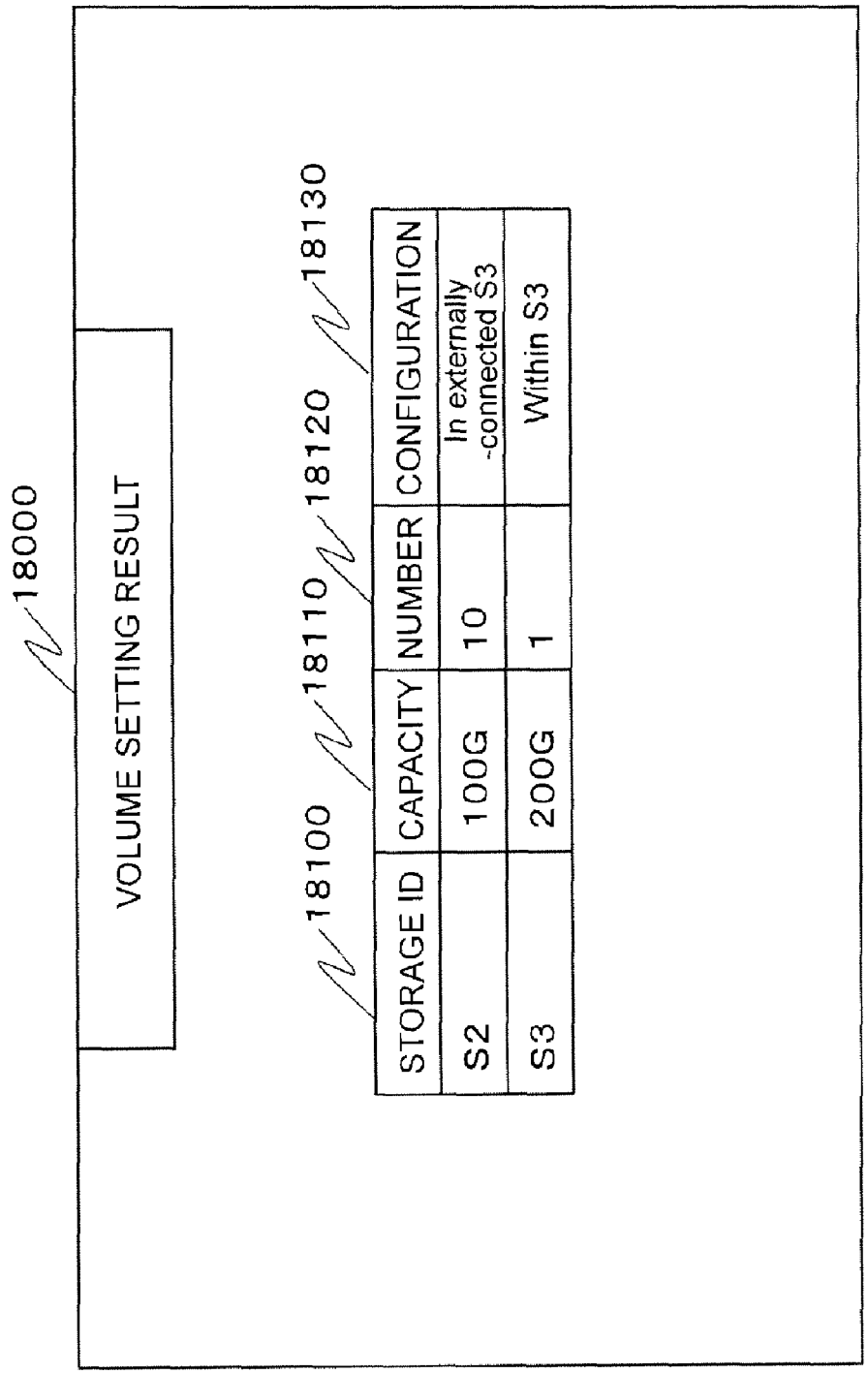
FIG. 18 shows a volume creation result screen.

FIG. 18 is a screen showing the result of the volume setting prepared by the storage manipulation/instruction program 1232 (17100 in FIG. 17).

The screen 18000 is displayed by the volume setting program 1234 on the display device (a part of the input/output unit 1210). The screen 18000 is for the user to check the result of the volume setting.

The screen 18000 includes: a storage ID field 18100; a capacity field 18110; number of volumes field 18120; and configuration field 18130 showing in which storage space has been reserved. On this screen, the user can check how the request the user set on the screen shown in FIG. 16 has been executed by referring to the configuration field 18130.

Specifically, FIG. 18 shows that, as can be seen in the configuration field 18130, the request for setting volumes in the storage S2 was realized by externally connecting space in the storage S3 and the request for setting a volume in the storage S3 was realized within the storage S3.

Incidentally, it is after the storage administrator mounts a disk that a volume is set, so accordingly, it is after the storage administrator inputs via the management computer that disk mounting is complete that the output information in FIG. 18 reflects such information.

In a case where both external connection and disk mounting have been performed, this information is registered in the field 18130 in a manner distinguishing between the two, for example, using different lines. For example, with regard to the storage S2, if five out of ten volumes have been set by disk mounting and the other five volumes have been set by external connection, the first line will show: "S2" in the storage ID field (18100); "100 G" in the capacity field (18110); "5" in the number field (18120); and "in storage S2" in the configuration field (18130).

The second line will show: "S2" in the storage ID field (18100); "100 G" in the capacity field (18110); "5" in the number field (18120); and "externally-connecting storage S3" in the configuration field (18130). Incidentally, examples of motives for expanding a storage capacity include, not only virtual volume setting, but also real volume setting.

Embodiment 2 of this invention will be explained below. In this explanation, only the differences from Embodiment 1 will be discussed and explanations for things in common will be omitted or simplified.

Figure 19:
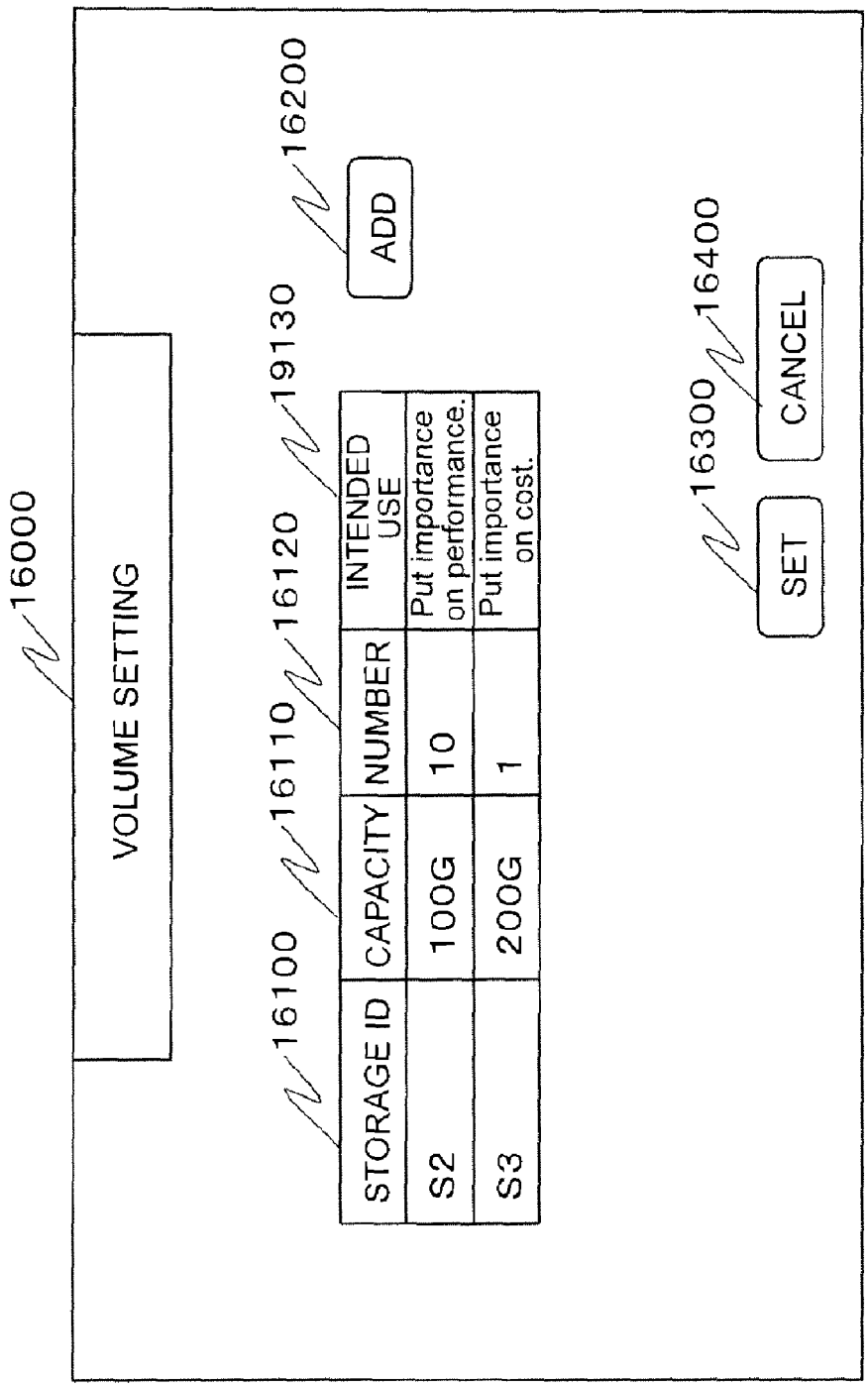
FIG. 19 shows a volume setting screen according to Embodiment 2 of this invention.

FIG. 19 shows a volume setting screen according to Embodiment 2, which is a modified example of the one shown in FIG. 16. A difference is that the volume setting screen in FIG. 19 includes an intended use field 19130. The intended use field 19130 is for setting intended use(s) for volume(s) to be set and the intended uses are referred to as conditions for selecting storage(s) for providing free space(s) to create the volume(s). When executing the processing to set volumes as requested in FIG. 19, a difference from the processing in the flowchart in FIG. 17 arises in the determination of space reservation operation in step 17030.

Examples of intended uses include "put importance on performance," and "put importance on cost." When intending to set a volume in the space-receiving storage, if the management user selects "put importance on performance," a storage with an FC drive or a storage with an SSD drive is searched for as a space-providing storage. If there is a storage having both of the drives, the SSD drive is selected as a drive for external connection or as a disk to be mounted in a space-receiving storage.

On the other hand, if "put importance on cost" is selected, for example, a storage with a SATA drive is selected as a space-providing storage. Thus, Embodiment 2 has a limited applicability with respect to capacity expansion compared to Embodiment 1 in the sense that selection of a storage is affected by the input intended use.

Incidentally, it is also possible to employ a configuration where, focusing on differences in the performances of controllers in the storages, indices indicating the differences in performance are registered in the intended use field 19130. Examples of such indices include: product names of controllers used in the storages and number of clocks. A storage with a controller with higher performance is likely to be selected as an external connection storage candidate to be connected to a space-receiving storage. Differences in costs of controllers may also be included as one of the differences in performance.

Embodiment 3 of this invention will be explained below by describing the differences from the above-described embodiments.

Embodiment 3 is characterized in that the volume setting screen shown in FIG. 16 and FIG. 19 does not include storage IDs. This is because what a user wishes is to expand the capacity of a host, not to choose a particular storage. Moreover, if the management computer recognizes the connections between hosts and storages, a storage ID may be automatically selected without requiring the user to select it.

In the flowchart shown in FIG. 17, in step 17020 for checking a free space, the management computer checks with all the storages as to whether or not they have free spaces. If free spaces can be reserved in more than one storage, the management computer refers to the storage utilization information table in FIG. 13 and selects a storage in terms of performance and power capacities.

A storage having more performance and power capacities, i.e., having a low capacity utilization rate in terms of performance and having power to spare before reaching a power threshold value in terms of power, is preferentially selected, a volume is created and then the processing completed in step 17100. If no free space is found, the management computer checks the total size of the free space in all the storages and if free space can be reserved, creates a volume and completes the processing.

In Embodiment 3, if there is a user request for reserving free space in one storage without selecting a storage by himself/herself, free spaces in the respective storages are checked for and if there is a storage having free space, a volume is created with that space, and then the processing is complete.

If there is a plurality of storages having free space, their performances and powers registered in the storage utilization information table in FIG. 13 are checked, a storage having more performance and power capacities is selected, a volume is created with the free space in that storage, and then the processing is complete.

If the selected storage has no free space, another storage is checked. The processing in Embodiment 3 is basically the same as the processing in FIG. 17, i.e., free space in a storage having most performance and power capacities is used to create a volume, and then the processing is complete. Then, the results shown in FIG. 18 are displayed. With the above configuration, it is possible to find a space in a storage that fits the use intended by the user without requiring the user to select a storage.

Figure 20:
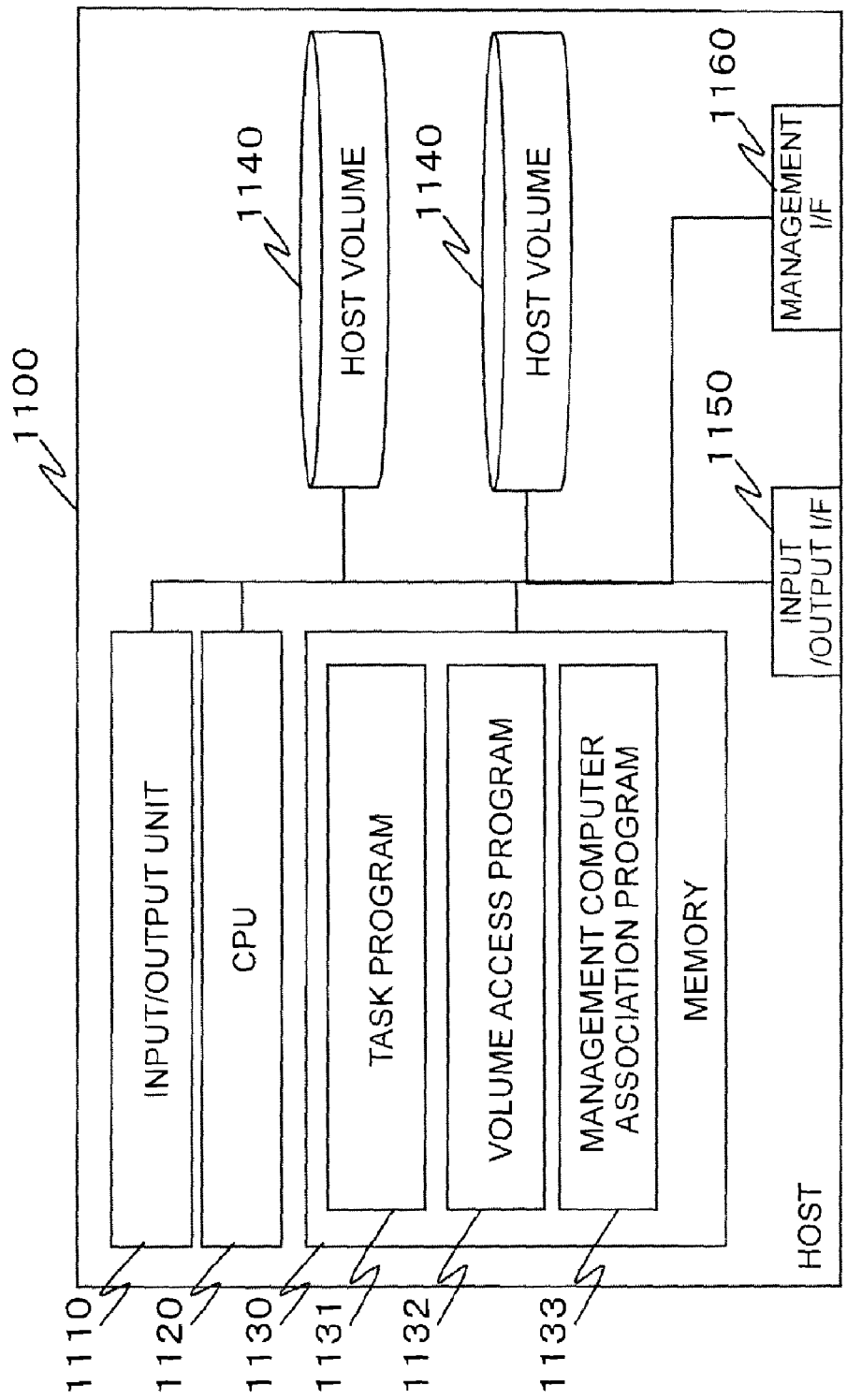
FIG. 20 is a hardware block diagram of a host computer.

Embodiment 4 of this invention will be explained below, mainly concerning the differences from the above-described embodiments. FIG. 20 is a block diagram of a host computer 1100. The host (computer) 1100 includes: an input/output unit 1110, a Central Processing Unit (CPU) 1120; memory 1130; host volumes 1140; an input/output I/F 1150 for handling input/output communication to/from the storages; and an management I/F 1160 connected to the management network 1400.

The memory 1130 stores: a task program 1131, a volume access program 1132 in charge of accessing volumes in the storages, and a management computer association program 1133 in charge of communicating with the management computer.

The host volumes 1140 are set for the host computer to use the volumes in the storages 1000. The volumes in the storages may be directly mounted in the host computer or logical volumes may be mounted in the host computer by a Logical Volume Manger (LVM).

The acquired storage configuration information 1235 in the management computer 1200 will be explained below. The acquired storage configuration information 1235 includes, in addition to the tables explained above in relation to the aforementioned embodiments, a task-storage configuration table 21000 shown in FIG. 21, a task-policy table 22000 shown in FIG. 22, and a host identification table 23000 shown in FIG. 23.

Figure 21:
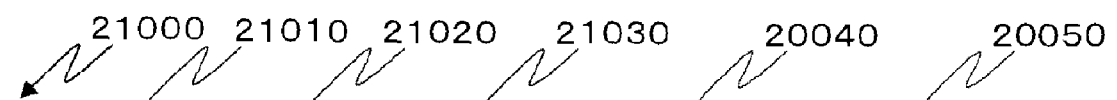
FIG. 21 shows a task-storage configuration table.

The task-storage configuration table 21000 shown in FIG. 21 stores the following information: a task ID 21010 representing the identifier of a task; a storage ID 21020 representing the identifier of a storage to which volumes used for that task belong to; an external storage ID 21030 representing the identifier of an external storage when the volumes used for the task exist in the external storage as real volumes; a volume ID 21040; and a host ID 21050 representing the identifier of the host where the volumes are mounted.

At the same time when the storage configuration acquisition program 1233 collects the storage configuration information 1042 from the storages 1000, it also accesses the management computer association program 1133 to obtain information for the hosts, thereby creating the task-storage configuration table 21000.

Specifically, the storage configuration acquisition program 1233 creates the task-storage configuration table 21000 by matching the volumes recognized by the hosts and the information for the volumes in the storages (shared information such as volume numbers and LUNs). It also collects the task IDs from the task programs in the hosts. If the storage configuration acquisition program 1233 cannot obtain the task IDs, a user may determine task IDs.

Figure 22:
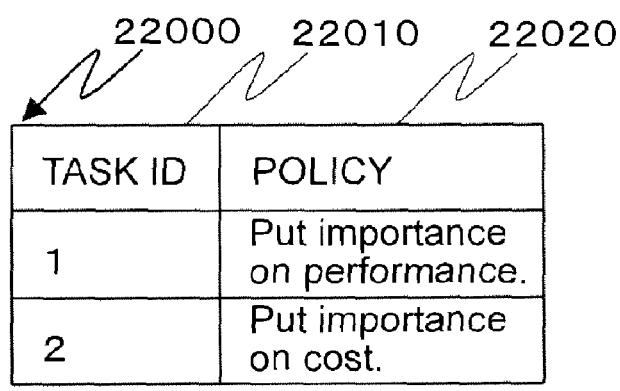
FIG. 22 shows a task-policy table.

FIG. 22 shows the task-policy table stored in the memory in the management computer. The task-policy table 22000 stores the following information: a task ID 22010 representing the identifier of a task; and a policy 22020 representing the policy for the task.

Flags for distinguishing between "put importance on performance" and "put importance on cost" are set in the task policy fields. When setting a volume in a storage, if importance is put on performance, a storage with good performance and low capacity utilization rate is selected as a space-providing storage. On the other hand, if importance is put on cost, a storage of low cost, and not a storage with good performance, is selected.

Figure 23:
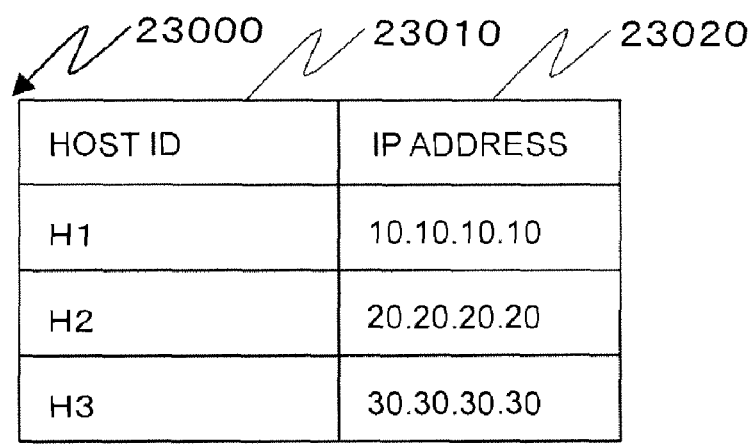
FIG. 23 shows a host identification table.

FIG. 23 shows a host identification table 23000. The host identification table 23000 stores the following information: a host ID 23010 representing the identifier of a host 1100; and an IP address 23030 the management computer 1200 refers to when accessing the host 1100 via the management network 1400. More than one IP address may be registered in one entry.

Figure 24:
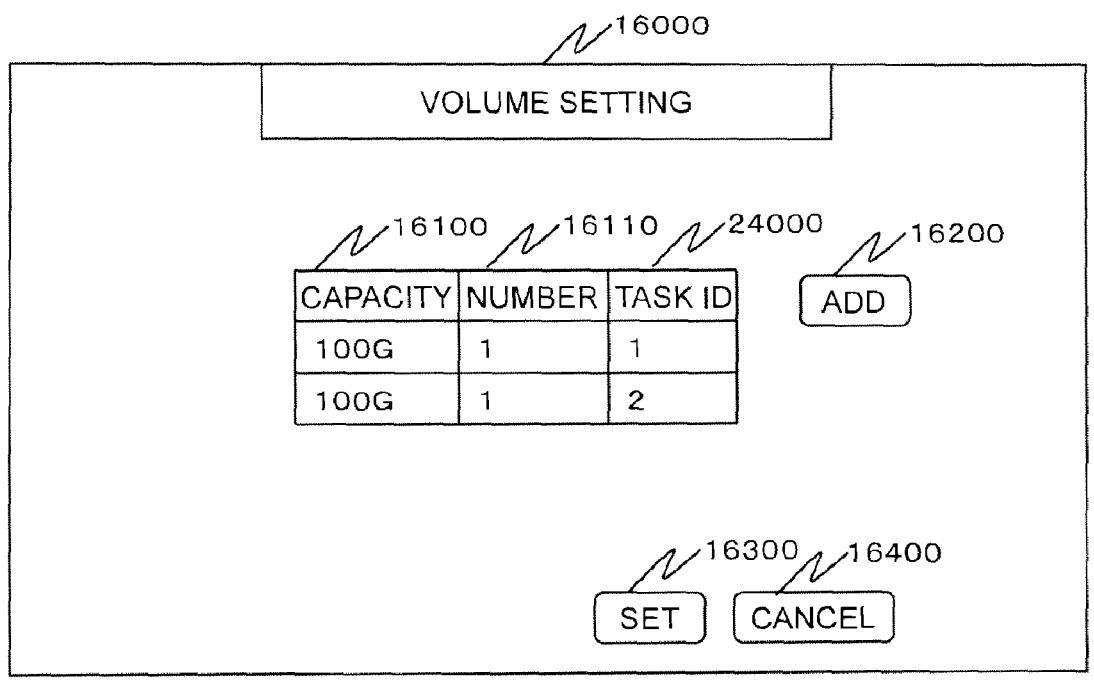
FIG. 24 shows a volume setting screen according to Embodiment 4 of this invention.

FIG. 24 shows the volume setting screen 16000, which is different from the one shown in FIG. 16 in that it includes a task ID field 24000 but no storage ID field 16100.

When the management computer accepts a request shown in FIG. 24, it executes the processing shown in the flowchart in FIG. 17. In the processing, the management computer grasps the characteristics and configurations of the volumes used for the tasks by referring to the task-storage configuration table 21000 in FIG. 21, and creates volumes in the storages connected to the management computer. Here, the management computer does not designate storage IDs as in FIG. 16 but designates task IDs based on the information in the task-storage configuration table 21000 in FIG. 21.

The task IDs are associated with the task policies as shown in FIG. 22 and, when the user designates a task ID on the screen in FIG. 24, a volume is set in the storage associated with the designated task ID according to the task policy. Then, the management computer executes the processing in the flowchart shown in FIG. 17 and creates a volume. In this way, the user can set a volume in a storage according to the task policy the user designates.

It is possible to employ a configuration where, after the error indication in step 17110, instead of using a new disk, another storage existing in the computer system and having more free space (a storage not registered in the external connection information table 12000 in FIG. 12) may be registered in the external connection information table 12000 as an externally-connectable storage and then the processing in FIG. 17 may be executed from the beginning.

The management computer gives priority to external connection if it is available but, if external connection is not available due to, for example, disconnection from a network, storage capacity is expanded by mounting a disk.

Moreover, when reserving a space for the first storage, if it is possible only by using a plurality of storages, both disk mounting and external connection may be employed to do so.

Moreover, although the RAID group capacity table 7000 in FIG. 7 has no field for setting threshold values, threshold values may be effective in a case where the storages are configured to automatically create/delete volumes.

Further, a storage space can be reserved in the first storage by using either a volume in a pool or a volume in a RAID group, however, it is preferable that a volume in a pool is reserved.

Incidentally, FIG. 16 explained about a case for a request to create ten virtual volumes each having a capacity of 100 G in the storage S2; however, needless to say, it is also possible to create real volumes. In that case, when a space in another storage cannot be reserved by external connection or disk mounting, an error indication (17110) is made as shown in the flowchart in FIG. 17.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system comprising:
a first storage apparatus and a second storage apparatus; the first storage apparatus having an external connection function configured to create a connection between the first and second storage apparatuses, and provide a storage area in the second storage apparatus as a logical volume accessible from a host computer; and
a management computer comprising a controller and a memory, the memory comprising a determination program configured to use configuration information from the first and second storage apparatuses to determine whether to: expand the storage area of the first storage apparatus by employing the external connection function to provide the logical volume in the second storage apparatus to the first storage apparatus; or internally connect a disk drive of the second storage apparatus to the first storage apparatus.

2. The computer system according to claim 1, wherein the controller is configured to:
accept a request for setting the logical volume of the second storage apparatus to the first storage apparatus; and
provide the storage area in the second storage apparatus as the logical volume to the first storage apparatus if the controller determines it is possible to set the logical volume of the second storage apparatus to the first storage apparatus, else provide the storage area in the second storage apparatus as a virtual volume having a virtualized storage capacity.

3. The computer system according to claim 2, wherein the management computer comprises a policy input configured to create the logical volume in the second storage apparatus.

4. The computer system according to claim 1, wherein the controller is configured to:
determine whether the second storage apparatus is connectable to the first storage apparatus;
employ the external connection function to connect the second storage apparatus to the first storage apparatus if the first and second storage apparatuses are connectable.

5. The computer system according to claim 1, wherein the controller is configured to:
judge a capacity utilization rate and power performance of the first and second storage apparatuses using the configuration information;
determine compatibility between the first and second storage apparatuses; and determine whether to:
expand the storage area of the first storage apparatus by employing the external connection function to provide the logical volume of the second storage apparatus to the first storage apparatus; and
internally connect the disk drive of the second storage apparatus to the first storage apparatus.

6. The computer system according to claim 5, wherein when the controller is configured to:
expand the storage area of the first storage apparatus by employing the external connection function to provide the logical volume of the second storage apparatus to the first storage apparatus if the controller determines the capacity utilization rate of the second storage apparatus is lower than the capacity utilization rate of the first storage apparatus, and the controller determines that the first and second storage apparatuses each contain compatible disks, else internally connect the disk drive of the second storage apparatus to the first storage apparatus.

7. A management computer in a computer system, the system comprising: a first storage apparatus and a second storage apparatus, the first storage apparatus having an external connection function configured to:
create a connection between the first and second storage apparatuses; and
provide a storage area in the second storage apparatus as a logical volume accessible from a host computer,
wherein the management computer is connected to the first and second storage apparatuses, and is configured to:
obtain configuration information from the first and second storage apparatuses:, and
manage the first and second storage apparatuses using the configuration information,
wherein the management computer comprises a controller and a memory, the memory comprising a determination program for determining whether to expand a storage area of the first storage apparatus by: employing the external connection function to provide the logical volume of the second storage apparatus to the first storage apparatus; or internally connecting a disk drive of the second storage apparatus to the first storage apparatus.

8. A management method for a computer system including a first storage apparatus, a second storage apparatus, and a management computer for managing the first and second storage apparatuses, the method comprising:
determining whether the first and second storage apparatuses are externally connectable to each other,
if so, performing the external connection;
else determining whether it is possible to internally connect a disk drive of the second storage apparatus to the first storage apparatus,
if it is possible to internally connect the disk drive, connecting the disk drive of the second storage apparatus to the first storage apparatus;
else determining there is no available free space.

* * * * *

UNITED STATES PATENT AND TRADEMARK OFFICE
CERTIFICATE OF CORRECTION

| | |
|---|---|
| PATENT NO. | : 8,296,543 B2 |
| APPLICATION NO. | : 12/616635 |
| DATED | : October 23, 2012 |
| INVENTOR(S) | : Masayasu Asano and Yuichi Taguchi |

It is certified that error appears in the above-identified patent and that said Letters Patent is hereby corrected as shown below:

Title page, item [54] and col. 1, line 1, Title, "Computer System". The correct title is:

COMPUTER SYSTEM, MANAGEMENT APPARATUS AND MANAGEMENT METHOD FOR THE COMPUTER SYSTEM

Signed and Sealed this
First Day of January, 2013

David J. Kappos
*Director of the United States Patent and Trademark Office*